(12) United States Patent
Gravagne et al.

(10) Patent No.: US 12,313,592 B2
(45) Date of Patent: May 27, 2025

(54) EDDY CURRENT PROBE AND METHOD FOR DETERMINING PLY ORIENTATION USING EDDY CURRENT AND ULTRASONIC PROBES

(71) Applicant: Verifi Technologies, LLC, Waco, TX (US)

(72) Inventors: Ian Gravagne, Waco, TX (US); David A. Jack, Waco, TX (US); Benjamin M. Blandford, Waco, TX (US); Matthew Newton, Gentry, AR (US); Gary Georgeson, Tacoma, WA (US); Tonoy Chowdhury, Waco, TX (US)

(73) Assignee: Baylor University, Waco, TX (US)

( * ) Notice: Subject to any disclaimer, the term of this patent is extended or adjusted under 35 U.S.C. 154(b) by 108 days.

(21) Appl. No.: 18/113,895

(22) Filed: Feb. 24, 2023

(65) Prior Publication Data

US 2023/0288373 A1    Sep. 14, 2023

Related U.S. Application Data

(60) Provisional application No. 63/314,785, filed on Feb. 28, 2022.

(51) Int. Cl.
*G01N 27/9013* (2021.01)
*G01N 27/90* (2021.01)
(Continued)

(52) U.S. Cl.
CPC ..... *G01N 27/9013* (2013.01); *G01N 27/9006* (2013.01); *G01N 27/9093* (2013.01); *G01N 29/0645* (2013.01); *G01N 29/4436* (2013.01)

(58) Field of Classification Search
CPC ............ G01N 27/9013; G01R 27/9006; G01R 27/9093; G01N 29/0645; G01N 29/4436
(Continued)

(56) References Cited

U.S. PATENT DOCUMENTS 4,167,878 A   9/1979   Bottcher et al.
4,955,235 A   9/1990   Metala et al.
(Continued)

FOREIGN PATENT DOCUMENTS

WO   WO-2019238303 A1 * 12/2019

OTHER PUBLICATIONS

Hofmann; Translation of WO 2019/238303 A1; Dec. 19, 2019; Translated by Clarivate Analytics (Year: 2019).*

*Primary Examiner* — Eman A Alkafawi
*Assistant Examiner* — Rahul Maini
(74) *Attorney, Agent, or Firm* — NEO IP

(57) ABSTRACT

A system and method for determining fiber orientation within a layered composite using an eddy current probe is discussed. The eddy current probe includes an array of coils that are excited such that an effective pole of the end effector of the probe moves in a ring pattern. The eddy current probe is moved across the surface of a part such that a two-dimensional scan of the part is generated, analogous to a C-scan in ultrasonic testing. The eddy current probe is able to be used to determine the fiber orientation of a layered composite material by scanning at a single point on the material. The eddy current data is able to be fused with data from an ultrasonic transducer to produce a comprehensive view of the part.

20 Claims, 35 Drawing Sheets
(6 of 35 Drawing Sheet(s) Filed in Color)

(51) Int. Cl.
*G01N 27/9093* (2021.01)
*G01N 29/06* (2006.01)
*G01N 29/44* (2006.01)

(58) Field of Classification Search
USPC .................................................. 324/754.01
See application file for complete search history.

(56) References Cited

U.S. PATENT DOCUMENTS

| | | |
|---|---|---|
| 5,025,215 A | 6/1991 | Pirl |
| 5,145,637 A | 9/1992 | Richardson et al. |
| 5,418,823 A | 5/1995 | Kervinen et al. |
| 5,481,916 A | 1/1996 | Macecek et al. |
| 5,915,277 A | 6/1999 | Patton |
| 7,305,898 B2 | 12/2007 | Cabanis et al. |
| 7,560,920 B1* | 7/2009 | Ouyang ............... G01N 27/902 324/242 |
| 8,166,821 B2 | 5/2012 | Killian et al. |
| 8,217,646 B2 | 7/2012 | Karpen |
| 8,424,385 B2 | 4/2013 | Park et al. |
| 8,536,860 B2 | 9/2013 | Boenisch |
| 8,670,952 B2 | 3/2014 | Drummy |
| 10,067,096 B2 | 9/2018 | Fedosovsky et al. |
| 10,823,703 B2* | 11/2020 | Kollgaard .......... G01N 29/0645 |
| 2006/0091880 A1* | 5/2006 | Feikert ................ G01N 27/902 324/228 |
| 2007/0217672 A1* | 9/2007 | Shannon ................ G06T 7/0006 382/152 |
| 2014/0305217 A1* | 10/2014 | Tapia ................ G01N 27/9013 901/44 |
| 2019/0277804 A1* | 9/2019 | Prager ................ G01N 27/902 |
| 2020/0088685 A1* | 3/2020 | Heuer ................ G01N 27/9046 |

* cited by examiner

EDDY CURRENT PROBE AND METHOD FOR DETERMINING PLY ORIENTATION USING EDDY CURRENT AND ULTRASONIC PROBES

CROSS-REFERENCE TO RELATED APPLICATIONS

This application is related to and claims priority from the following US patents and patent applications: this application claims priority from U.S. Provisional Patent Application No. 63/314,785, filed Feb. 28, 2022. Each of the above applications is incorporated herein reference in its entirety.

BACKGROUND OF THE INVENTION

1. Field of the Invention

The present invention relates to non-destructive testing probes and methods of non-destructive testing, and more specifically to eddy current probes and probes including both ultrasonic and eddy current transducers.

2. Description of the Prior Art

It is generally known in the prior art to provide non-destructive testing (NDT), non-destructive inspection (NDI), or non-destructive examination (NDE) probes. Common methods of non-destructive testing utilize ultrasonic, eddy current, thermographic, radiographic, or acoustic transducers or utilize visual analysis of dyes or magnetic particles applied to the object being examined. Most commonly, techniques of non-destructive testing utilize only a single type of transducer at one time. However, it is also known to perform NDT using multiple types of transducers, including combinations of eddy current and ultrasonic probes.

Prior art patent documents include the following:

U.S. Pat. No. 10,823,703 for Real-time fusion of ultrasound and eddy current data during non-destructive examination by inventors Kollgaard et al., filed Jan. 8, 2019 and issued Nov. 3, 2020, discloses an apparatus and methods for real-time fusion of data acquired using ultrasonic and eddy current area sensors during nondestructive examination. The ultrasonic data is acquired using an array of ultrasonic transducer elements configured to enable the production and display of a C-scan of a small area. The ultrasonic transducer array may be one- or two-dimensional. The eddy current sensor can be a single pair of induction coils, a multiplicity of coil pairs, or a coil configuration in which the numbers of drive coils and sense coils are not equal. The eddy current sensor is able to provide data about the test material, such as material thickness or conductivity, to complement the ultrasonic data or enable auto-setup of the ultrasonic inspection device.

U.S. Pat. No. 5,418,823 for Combined ultrasonic and eddy-current method and apparatus for non-destructive testing of tubular objects to determine thickness of metallic linings or coatings by inventors Kervinen et al., filed Jan. 4, 1994 and issued May 23, 1995, discloses a combined ultrasonic and eddy-current method and apparatus for non-destructively determining the liner thickness of a zirconium liner provided at the inner surface of a zirconium alloy nuclear fuel rod tube utilizes dimensional data acquired via conventional ultrasonic measurement techniques and impedance data acquired through electromagnetic techniques to calculate liner thickness in accordance with a specific formula. The apparatus utilizes a computer or programmable arithmetic unit with associated memory and I/O devices connected to electromagnetic and ultrasonic measurement subsystems. A particular eddy-current probe arrangement consisting of a differential coil pair is employed to obtain impedance measurements from the outside of the cladding tube. Calibrated reference impedance values for various different inner and outer tube diameters having a constant liner thickness are measured and retained in a memory. Calibrated reference impedance values for tubes of various liner thicknesses with the same inside and outside diameter dimensions are also measured and stored. A specimen cladding tube is tested and an inside diameter is computed using conventional electromagnetic techniques. The specimen tube inside diameter is also measured ultrasonically and a specific calculation of liner thickness is performed based on the difference between the inside diameter as determined by ultrasonic technique and the inside diameter as measured by eddy-current technique. The specific method of calculation utilized corrects for the erroneous effect that variations in cladding tube liner thickness can have on dimensions computed via conventional electromagnetic eddy-current techniques alone.

U.S. Pat. No. 5,915,277 for Probe and method for inspecting an object by inventor Patton, filed Jun. 23, 1997 and issued Jun. 22, 1999, discloses a probe and method for inspecting a complex shaped object having an irregular surface. In the invention, a flexible film of piezoelectric elements is combined with a flexible film of eddy current elements into a single probe. The probe simultaneously inspects the volume and the surface of the object by using the flexible ultrasonic transducer and the flexible eddy current sensor, respectively.

U.S. Pat. No. 5,481,916 for Combined ultrasonic and rotating eddy current probe and method of non-destructive testing of materials by inventors Macecek et al., filed Jul. 22, 1994 and issued Jan. 9, 1996, discloses an apparatus, for non-destructively testing for flaws in materials, having a housing assembly with a rotor and a stator for passing over the testing material, an ultrasonic probe fixed to the stator, and an eddy current probe mounted on the rotor. In operation the rotor rotates the eddy current probe about the ultrasonic probe and an indexing coil on the ultrasonic probe monitors the relative position of the eddy current probe. The rotating eddy current probe generates eddy currents in the testing material such that internal flaws effect the normal feed back to the probe. Changes in this feed back are monitored to determine, in conjunction with the indexing coil, the existence and location of flaws in the testing material. In the preferred embodiment a rotary transformer electromagnetically bonds the rotating eddy current probe to the housing stator. Reflected signals received back by the ultrasonic probe are also monitored to determine the existence of flaws, more readily detected by ultrasonic testing, below the probe.

U.S. Pat. No. 10,067,096 for Apparatus, system and method for automated nondestructive inspection of metal structures by inventors Fedosovsky et al., filed Sep. 2, 2016 and issued Sep. 4, 2018, discloses automated nondestructive inspection of a metal structure having a surface comprises an ultrasonic nondestructive inspection unit, a nondestructive inspection unit based on magnetic flux leakage method, an eddy-current nondestructive inspection unit, a control unit connected to the ultrasonic nondestructive inspection unit, the nondestructive inspection unit based on the magnetic flux leakage method and the eddy-current nondestructive inspection unit for sending control signals to carry out inspection of the metal structure, and a navigation unit connected to the control unit, wherein the navigation unit determines a position of said apparatus relative to the metal structure, determines a state of the surface of the metal structure and sends signals into the control unit. The non-destructive inspection unit based on magnetic flux leakage method changes a magnetic field induction generated by this unit from a minimum value close to zero value to a predetermined maximum value.

U.S. Pat. No. 8,424,385 for Inspecting device including detachable probe by inventors Park et al., filed Oct. 8, 2009 and issued Apr. 23, 2013, discloses an inspecting device including a detachable probe has a link structure, and thus a subject having various diameters. In addition, since various probes are changeably used in a scanner housing, ultrasonic wave testing and eddy current testing are simultaneously performed.

U.S. Pat. No. 8,166,821 for Non-destructive test evaluation of welded claddings on rods of hydraulic cylinders used for saltwater, brackish and freshwater applications by inventors Killian et al., filed Jun. 29, 2009 and issued May 1, 2012, discloses a method of maintaining a rod of a hydraulic cylinder for a motion compensation system of an offshore platform including non-destructive testing of a metallic cladding deposited onto the rod. An inspection crawler includes a visual inspection device, an eddy current inspection device and an ultrasonic inspection device. The method includes rotating the visual inspection device, the eddy current inspection device and the ultrasonic inspection device around a circumference of the rod while moving the inspection crawler along a longitudinal axis of the rod to simultaneously collect data related to the metallic cladding from the visual inspection device, the eddy current inspection device and the ultrasonic inspection device. The data is analyzed to detect any discontinuities, i.e., defects, in the metallic cladding.

U.S. Pat. No. 8,217,646 for Inspection apparatus for performing inspections by inventor Karpen, filed Oct. 17, 2008 and issued Jul. 10, 2012, discloses an inspection apparatus that can include at least one probe receiving unit. The at least one probe receiving unit can be capable of processing data corresponding to one or more of image information of the type that can be generated by a visual inspection probe, eddy current information of the type that can be generated by a eddy current probe, and ultrasound information of the type that can be generated by a ultrasound probe.

U.S. Pat. No. 5,145,637 for Incore housing examination system by inventors Richardson et al., filed Aug. 19, 1991 and issued Sep. 8, 1992, discloses an automated system for examining incore housing welds in a nuclear reactor from above. The probe uses both ultrasonic and eddy current non-destructive inspection coils to examine the weld for indications, or flaws. It is inserted into the incore housing tube from above because of the high radiation exposure workers experienced using the prior method of inserting a probe into the incore housing from below. This is conveniently done when the incore flux monitors are removed during standard maintenance, and is performed from the refueling bridge.

U.S. Pat. No. 8,536,860 for Method and apparatus for non-destructive testing by inventor Boenisch, filed Jan. 28, 2008 and issued Sep. 17, 2013, discloses a method and apparatus in which at least two different test phases are performed on a test object, selected from: conventional eddy current testing, partial saturation eddy current testing, and ultrasonic testing. Measurement data sets are obtained from the at least two different test phases, with each measurement data set comprising measurement data corresponding to a plurality of test positions. The data sets are combined in a data processing means and the combined measurement data is processed to evaluate a damage condition of the test object. In a preferred embodiment, all of conventional eddy current testing, partial saturation eddy current testing, and ultrasonic testing are performed. The apparatus may be provided in two or more sub-assemblies, of which one may be an internal test tool and one may be an external tool. Alternatively, the apparatus may be capable of carrying out all three of the test phases.

U.S. Pat. No. 4,167,878 for Apparatus for non-destructively testing materials by inventors Bottcher et al., filed Nov. 15, 1977 and issued Sep. 18, 1979, discloses an apparatus for non-destructively testing materials by ultrasound and eddy current, which includes an ultrasound material testing device operating in conformity with the electrodynamic converter principle, and also includes an eddy current material testing device. The testing coils of both testing devices are centrally arranged with regard to each other in such a way that the workpiece regions controlled by the testing coils have an at least approximately common central axis. The apparatus furthermore includes a control device which in conformity with the energization of the coil for creating the strong magnetic field for operation of the electrodynamic converter is operable briefly alternately respectively to turn-on and turn-off the respective testing coil of the ultrasound and eddy current material testing device.

U.S. Pat. No. 7,305,898 for Installation for non-destructive inspection of a part by inventors Cabanis et al., filed Jun. 3, 2005 and issued Dec. 11, 2007, discloses an installation for non-destructive inspection making use simultaneously of sensors responsive to different physical characteristics. In an example, a sensor support, e.g. a kind of carriage having running wheels via which it comes into contact with the surface to be inspected, is fitted with two types of sensor, namely an eddy current sensor and at least one ultrasound sensor.

U.S. Pat. No. 5,025,215 for Support equipment for a combination eddy current and ultrasonic testing probe for inspection of steam generator tubing by inventor Pirl, filed Aug. 16, 1989 and issued Jun. 18, 1991, discloses a system for helically driving an inspection probe within a tube of a nuclear steam generator is provided, wherein the system is particularly useful in driving a combination eddy-current and ultrasonic probe. The system generally includes a head assembly insertable with the tube for inspection, a drive frame assembly to be located external of the steam generator, and a conduit system connecting the head assembly and drive frame assembly. Particularly, the head assembly includes a portion fixable to the tube by a pressure bladder and a movable portion helically movable with a probe to the fixable portion. The drive motor and electrical pick-up are slidably movable on the drive frame assembly to move linearly with the probe during inspection so as not to limit the stroke of the probe, wherein the drive motor and pick-up are connected with the head assembly by way of two flexible coaxial conduits. The two conduits further provide two fluid flow paths to supply fluid to the bladder and couplant fluid for use during ultrasonic testing.

U.S. Pat. No. 4,955,235 for Apparatus and method for providing a combined ultrasonic and eddy current inspection of a metallic body by inventors Metala et al., filed Jun. 23, 1989 and issued Sep. 11, 1990, discloses an apparatus and a method for simultaneously inspecting the walls of a tube with both ultrasonic and eddy current probes. The apparatus generally comprises a cylindrical housing assembly insertable within the tube to be inspected, and a probe carrier rotatably mounted within and helically movable with respect to the housing. The probe carrier holds three ultrasonic probes for transmitting ultrasonic beams which are directly oriented radially, chordally, and axially with respect to the longitudinal axis of the tube, as well as an eddy current probe for simultaneously inspecting the walls of the tube with electromagnetic lines of flux. The apparatus further includes a helical drive train formed from a lead screw assembly having a motor means, a drive shaft, and a drive sleeve for imparting a helical scanning motion to the probe carrier with respect to the housing. The interior of the drive sleeve is slidably engaged to the shaft which is in turn coupled to the output of the motor, while the outside of the drive sleeve is threadedly engaged to the interior of the housing. The probe carrier is in turn coupled to the drive sleeve. In the method of the invention, the data generated by the three eddy current probes is correlated with the data generated by the eddy current probe for each specific section of the tube, and displayed simultaneously to the system operator. The resulting complementary display of both ultrasonic and eddy current probe information allows the system operator to accurately determine the size, shape and nature of any flaws which may be present in the walls of the tube.

U.S. Pat. No. 8,670,952 for Non-destructive inspection instrument employing multiple sensor technologies in an integral enclosure by inventor Drummy, filed Apr. 18, 2011 and issued Mar. 11, 2014, discloses a non-destructive inspection (NDI) instrument including a sensor connection system configured to receive test signals from at least two different types of NDI sensors which are configured to obtain test signals from an object being tested. The sensor connection system has sensor-specific connection circuits and at least one common sensor connection circuit. A data acquisition circuitry is coupled to the sensor connection and has sensor-specific data acquisition circuits and at least one common data acquisition circuit. It is further coupled to a common digital data processor which executes sensor-specific processing modules and at least one common processing module. A common display screen and user interface is coupled to the data processor and enables programs including sensor-specific user interface modules and at least one common user interface module. The sensor types preferably include all of or any combination of an ultrasound sensor, an eddy current sensor and acoustic sensor.

SUMMARY OF THE INVENTION

The present invention relates to non-destructive testing probes and methods of non-destructive testing, and more specifically to eddy current probes and probes including both ultrasonic and eddy current transducers.

It is an object of this invention to utilize eddy currents to determine the ply orientation of a test object, detect the presence of defects and/or irregularities within a composite material or other materials having components with directionally dependent conductivities, potentially of an anisotropic nature and quantify the size or nature of the defects and/or irregularities.

It is also an object of this invention to provide a probe with a single end effector with multiple types of transducers (e.g., eddy current and ultrasonic) for use in non-destructive testing.

In one embodiment, the present invention is directed to a system for determining ply orientation of a composite material, including an eddy current probe including a two-dimensional matrix of induction coils in communication with at least one signal generator and a processor, at least one motor configured to move the eddy current probe along a plane substantially coplanar to a surface of the composite material, wherein the eddy current probe is positioned proximate to, but not in contact with, the surface of the composite material, wherein the at least one signal generator is operable to activate a linear set of induction coils within the two-dimensional matrix of induction coils aligned along a first axis, wherein the at least one signal generator is operable to vary which of the two-dimensional matrix of induction coils are activated such that the first axis while the at least one signal generator remains substantially stationary over a section of the composite material, and wherein the at least one motor is configured to translate the eddy current probe to a new location after the first axis of the activated linear set of induction coils has rotated at least 360°.

In another embodiment, the present invention is directed to a method for determining ply orientation of a composite material, including providing an eddy current probe including a two-dimensional matrix of induction coils in communication with at least one signal generator and a processor, the eddy current probe being positioned proximate to, but not in contact with, the surface of the composite material, the at least one signal generator activating a linear set of induction coils within the two-dimensional matrix of induction coils aligned along a first axis, the at least one signal generator varying which of the two-dimensional matrix of induction coils are activated such that the first axis while the at least one signal generator remains substantially stationary over a section of the composite material, and at least one motor translating the eddy current probe to a new location after the first axis of the activated linear set of induction coils has rotated at least 360°.

In yet another embodiment, the present invention is directed to a system for determining ply orientation of a composite material, including an eddy current probe including a two-dimensional matrix of induction coils in communication with at least one signal generator and a processor, an ultrasonic transducer configured to generate ultrasonic scan data of the composite material, wherein the eddy current probe is positioned proximate to, but not in contact with, the surface of the composite material, wherein the ultrasonic scan data includes one or more C-scans of the composite material at different depths and/or different locations on the composite material, wherein the at least one signal generator is operable to activate a linear set of induction coils within the two-dimensional matrix of induction coils aligned along a first axis, and wherein the at least one signal generator is operable to vary which of the two-dimensional matrix of induction coils are activated such that the first axis while the at least one signal generator remains substantially stationary over a section of the composite material.

These and other aspects of the present invention will become apparent to those skilled in the art after a reading of the following description of the preferred embodiment when considered with the drawings, as they support the claimed invention.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

PRIOR ART

PRIOR ART

PRIOR ART

PRIOR ART

DETAILED DESCRIPTION

Figure 1:
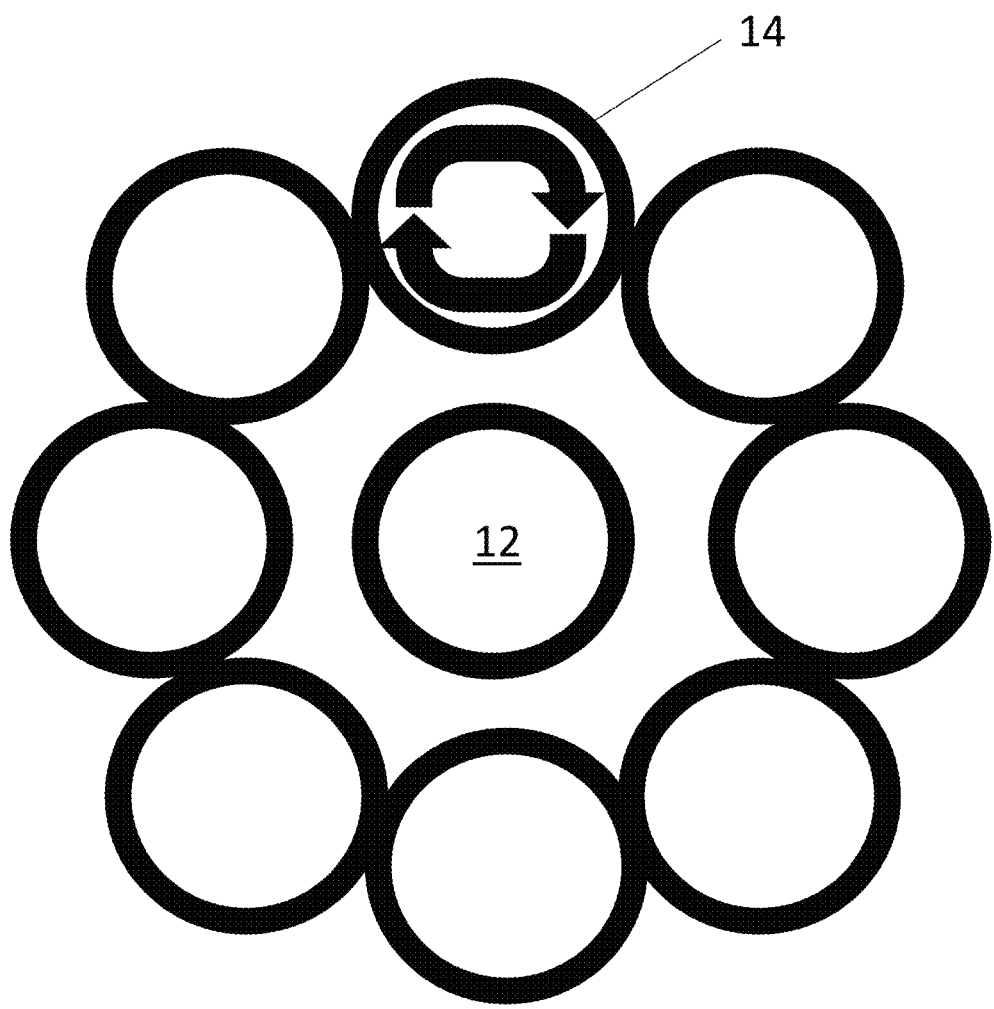
FIG. 1 illustrates a configuration of coils of an eddy current probe according to one embodiment of the present invention.

The present invention relates to a non-destructive testing probe and methods of non-destructive testing, and more specifically to eddy current probes and probes including both ultrasonic and eddy current transducers.

In one embodiment, the present invention is directed to a system for determining ply orientation of a composite material, including an eddy current probe including a two-dimensional matrix of induction coils in communication with at least one signal generator and a processor, at least one motor configured to move the eddy current probe along a plane substantially coplanar to a surface of the composite material, wherein the eddy current probe is positioned proximate to, but not in contact with, the surface of the composite material, wherein the at least one signal generator is operable to activate a linear set of induction coils within the two-dimensional matrix of induction coils aligned along a first axis, wherein the at least one signal generator is operable to vary which of the two-dimensional matrix of induction coils are activated such that the first axis while the at least one signal generator remains substantially stationary over a section of the composite material, and wherein the at least one motor is configured to translate the eddy current probe to a new location after the first axis of the activated linear set of induction coils has rotated at least 360°.

In another embodiment, the present invention is directed to a method for determining ply orientation of a composite material, including providing an eddy current probe including a two-dimensional matrix of induction coils in communication with at least one signal generator and a processor, the eddy current probe being positioned proximate to, but not in contact with, the surface of the composite material, the at least one signal generator activating a linear set of induction coils within the two-dimensional matrix of induction coils aligned along a first axis, the at least one signal generator varying which of the two-dimensional matrix of induction coils are activated such that the first axis while the at least one signal generator remains substantially stationary over a section of the composite material, and at least one motor translating the eddy current probe to a new location after the first axis of the activated linear set of induction coils has rotated at least 360°.

In yet another embodiment, the present invention is directed to a system for determining ply orientation of a composite material, including an eddy current probe including a two-dimensional matrix of induction coils in communication with at least one signal generator and a processor, an ultrasonic transducer configured to generate ultrasonic scan data of the composite material, wherein the eddy current probe is positioned proximate to, but not in contact with, the surface of the composite material, wherein the ultrasonic scan data includes one or more C-scans of the composite material at different depths and/or different locations on the composite material, wherein the at least one signal generator is operable to activate a linear set of induction coils within the two-dimensional matrix of induction coils aligned along a first axis, and wherein the at least one signal generator is operable to vary which of the two-dimensional matrix of induction coils are activated such that the first axis while the at least one signal generator remains substantially stationary over a section of the composite material.

Non-destructive testing (NDT) uses a variety of techniques in order to inspect parts for defects, inclusions, and/or irregularities without damaging the parts. Examples of defects, inclusions, or irregularities include foreign objects within the part, delamination between layers of the part, breakage in fibers within a part, cracks in the part, low bond line thickness, and wrinkles, both in-plane and out of plane, in the layers of the part, among others. Additionally, detectable features include anisotropies in metals created during the manufacturing of the metal, such as during rolling, non-uniform cooling, drawing, grain alignment, or other processes for forming the metal. Techniques for finding such defects include eddy currents, ultrasonic testing, acoustic testing, thermographic analysis, visual analysis (often using fluorescent dyes or magnetic particles), and radiographic analysis. Detection of features with NDT is important, as features detected through NDT are capable of indicating parts that need to be replaced and that otherwise risk premature, and potentially catastrophic failure.

Eddy Current NDT involves running an alternating or pulsed current through a coiled wire to induce an oscillating magnetic field. When the coil is positioned proximate to the surface of a conductive, or semiconductive, material, an eddy current is induced in the conducting material, which, in turn, generates its own magnetic field. A receiver coil, or other type of eddy current detecting device, is then able to determine properties of the conductive material, such as the thickness, presence of cracks, or other changes in the material's conductive properties, based on changes in the amplitude and/or phase of the received signal. Eddy current testing has largely been utilized with reference to conductive metallic materials. Eddy current testing is most commonly used to determine properties near the surface of a material, as eddy currents do not have strong depth penetration, but have high surface resolution. Typical output plots for eddy current testing include impedance plane plots that graph coil resistance on the x-axis and inductive reactance on the y-axis, which allows for detection of cracks on the surface of the material.

Currently, eddy current NDT is most often performed with a single probe that provides a single signal for one location on a test object's surface. While this technique is potentially able to detect larger cracks, the resolution is limited and it is unable to determine other properties of a material, such as fiber orientation. Those systems that do use an array of eddy current producing coils align the coils in straight lines for scanning larger areas of a surface quickly, but do not align the currents to produce a rotating effective pole of the eddy currents suitable for detecting anisotropic conductivity in a test material at a single point.

Ultrasonic NDT involves exciting a transducer with electric energy (e.g., applying a voltage pulse across the ultrasonic transducer). The transducer is made from a piezoelectric material and is capable of converting the electrical energy into mechanical energy, causing the transducer to quickly vibrate, producing sound waves. A piezoelectric receiver is then able to receive mechanical energy in the form of the sound waves after the waves have interacted with a test object and convert the mechanical energy into an electrical signal (e.g., a voltage) for analysis. One of ordinary skill will understand that the present invention is not intended to be limited with regard to what type of device is used to produce the ultrasonic waves that are detected to generate ultrasonic scan data. For example, in one embodiment, the ultrasonic waves are generated by known laser ultrasound methods. Therefore, where the term "ultrasonic transducer" is used herein, it will be understood that the ultrasonic transducer is able to be replaced with a laser-producing device to produce the ultrasonic waves in the material that are used to generate the ultrasonic scan data. One mode for ultrasonic NDT, known as through-transmission mode, involves placing a transducer to produce ultrasonic waves on one side of a test object and a receiver to receive ultrasonic waves located on an opposite side of the test object relative to the transducer. Therefore, the receiver receives the waves after they have traveled through the material and is able to provide information such as the thickness of the material, the type of material, and/or the presence of defects or irregularities based on the attenuation of the sound waves and/or the time taken to travel from the transducer to the receiver. Another mode for ultrasonic NDT, known as pulse-echo mode, involves placing a transducer to produce ultrasonic waves on one side of a test object and then detecting the ultrasonic waves on the same side of the test object after they have reflected off the test object. In this mode, the transducer commonly also acts as the receiver of the ultrasonic waves. Ultrasonic testing provides improved depth resolution over eddy current testing, though the resolution near the surface of the material is often limited, as a high acoustic mismatch between the surrounding air (or coupling material) and the test object often produces a particularly large signal that obscures signals close to the surface. Unlike eddy current testing, which is traditionally used for metals, with few instances of the use of eddy current inspection for composites, ultrasonic testing is used for a wide variety of materials, including both composites and metals.

Ply orientation is one feature of carbon fiber and other layered composite materials that makes a significant difference in the performance of the materials. Because carbon fiber materials are formed from individual fibers within a polymer matrix, the strength along any given axis for the material is dependent on how the fibers are oriented. For example, fibers are able to be unidirectionally oriented, biaxially oriented, woven, or oriented in some other manner. Alternatively, fibers are able to be entirely randomly oriented within a layer, though this is less common for high performance materials.

None of the prior art discloses utilizing both eddy current probes and ultrasonic probes to determine ply orientation and detect defects in a composite material. Previous inventions that combine eddy current and ultrasonic testing commonly utilize the ultrasonic testing to generate a C-scan of the part to detect defects, while the eddy current testing is used to determine the thickness of a surface layer as a supplement to the ultrasonic data, such as in the systems described in U.S. Pat. Nos. 10,823,703 and 10,209,223 (which are incorporated herein by reference in their entireties), but does not involve creating C-scan slices using the eddy current probes, nor using the eddy current probes to determine locally directionally dependent properties such as fiber orientation or anisotropic conductivity.

"Characterisation of carbon fibre-reinforced polymer composites through radon-transform analysis of complex eddy-current data" by Hughes et al. attempted to use rotational eddy current scans to determine ply orientation of a carbon-fiber reinforced polymer. It then used two dimensional (2D) Fast Fourier Transforms (FFTs) and Radon Transforms (RTs) to process the data, but Hughes et al. is limited in multiple regards. First, it requires physically rotating the probe, which is impractical and imprecise in some situations. Second, the method is only capable of determining the bulk orientation of fibers within a composite as a function of depth, not a layer-by-layer decomposition of the composite. The method used by Hughes, however, is generally only capable of estimating depth unless input assumptions are made about layup order within the material that are often impractical when operating in the field.

Referring now to the drawings in general, the illustrations are for the purpose of describing one or more preferred embodiments of the invention and are not intended to limit the invention thereto.

The present system includes at least one probe (e.g., an eddy current probe or a combined eddy current and ultrasonic probe) connected to a signal generator, operable to transmit electrical signals to the at least one probe, a processor operable to receive signal data from the at least one probe and analyze the signal data, a database operable to store signal data produced by the at least one probe, and a display means (e.g., a computer monitor), operable to display representations of the signal data.

FIG. 1 illustrates a configuration of coils of an eddy current probe according to one embodiment of the present invention. In one embodiment, the present invention utilizes an eddy current probe with separate transmit and receiver coils. The term "receiver coils" as used herein is not limited to eddy current inducing coils, but also includes any form of device capable of detecting eddy currents known in eddy current testing, such as at least one magnetic flux sensor, at least one hall effect sensors and/or at least one giant magnetoresistance (GMR) sensor. In one embodiment, the receiver coil 12, which is operable to detect an induced eddy current signal in the part, is centrally located and a plurality of transmitter coils 14, which are operable to induce an eddy current in the part, are located in a ring positioned radially outwardly around the receiver coil 12. In one embodiment, the transmitter coils 14 are activated one-by-one sequentially around the receiver coil at each tested position on the part, allowing the probe to gain a more accurate, higher resolution signal from the test object. In this embodiment, the transmitter coils are deactivated when the next coil is activated. In another embodiment, the transmitter coils 14 are not individually activated in a ring, but one or more transmitter coils 14 are activated and deactivated such that the effective pole of the coils moves in a circle around the receiver coil 12. Whether or not the transmitter coils 14 are individually activated or whether the effective pole is generated using a plurality of transmitter coils 14, it is important that a constant magnetic power is maintained for the transmitter coils 14. In one embodiment, instead of individually activating the transmitter coils, the amount of current running through an activated coil is slowly decreased, while the amount of current in the sequentially next coil is gradually increased, which causes the effective pole of the array to be able to be more precisely controlled, thereby improving angular resolution. The effect is the generation of a rotational eddy current scan, or an "r-scan," that is able to be used to determine ply orientation.

In one embodiment, the effective pole of the array is rotated approximately 360°. In one embodiment, the effective pole of the array is rotated approximately 360°, but if the resulting signal is too noisy, then the effective pole is rotated 360° one or more additional times. In an instance where the effective pole completes more than one full rotation, the system automatically averages the data produced by each full rotation so as to reduce noise and refine the signal data.

Figure 2:
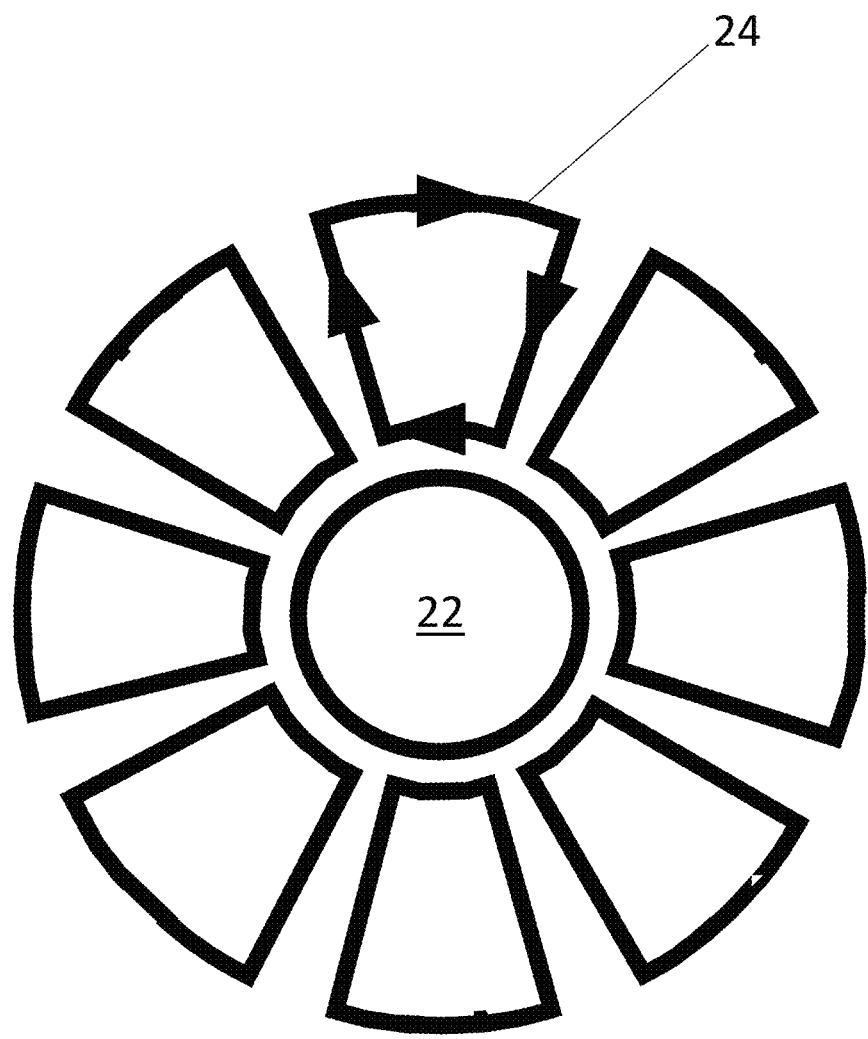
FIG. 2 illustrates a configuration of coils of an eddy current probe according to another embodiment of the present invention.

One of ordinary skill in the art will understand that the probe is not limited to circular coils. In fact, non-circular transmitter coils 24 are able to be used, as shown in FIG. 2, to more tightly pack transmitter coils 24 around the receiver coil 22. While FIGS. 1 and 2 show eight transmitter coils surrounding a receiver coil, one of ordinary skill in the art will understand that the present invention is not intended to be limiting as to the number of transmitter coils, which are able to include greater than or less than eight coils. Furthermore, one of ordinary skill in the art will understand that the present invention is not limited to a ring arrangement of the transmitter and receiver coils. The transmitter and receiver coils are capable of being arranged in an array of any configuration that allows the coils to be activated such that an effective pole is able to be swept across a full 360° rotation. In one embodiment, a full rotation of the effective pole is accomplished within at most 10 seconds. In one embodiment, a full rotation of the effective pole is accomplished within at most 5 seconds. In one embodiment, a full rotation of the effective pole is accomplished within at most 1 second.

In another embodiment, the central coil of the ring shown in FIGS. 1 and 2 is a transmitter coil and a plurality of receiver coils are arranged around the transmitter coil. In this embodiment, the plurality of receiver coils are sequentially activated so as to detect the induced eddy currents.

In one embodiment, a differential scanning technique is employed for the eddy current probe. In differential scanning, multiple adjacent coils are activated at once. The system is operable to detect a discrepancy between the induced eddy currents generated by the adjacent coils. Where the material has no defects or irregularities, the difference between the induced eddy currents will be approximately zero. However, when scanning an area with a defect (e.g., a crack), the current in the area around the defect moves asymmetrically and a small differential in the strength of the magnetic field between the two coils is produced, which is detectable by the receiver coil. Differential scanning has the advantage of being more sensitive than other techniques and being less prone to noise from lift-off effects.

In one embodiment, the eddy current coils extend outwardly from a base of an end effector of a probe used to scan a test material. In one embodiment, the base is a substantially flat, planar surface and, during a scan, the base is placed such that it is substantially parallel to the test surface of the test material.

Figure 3:
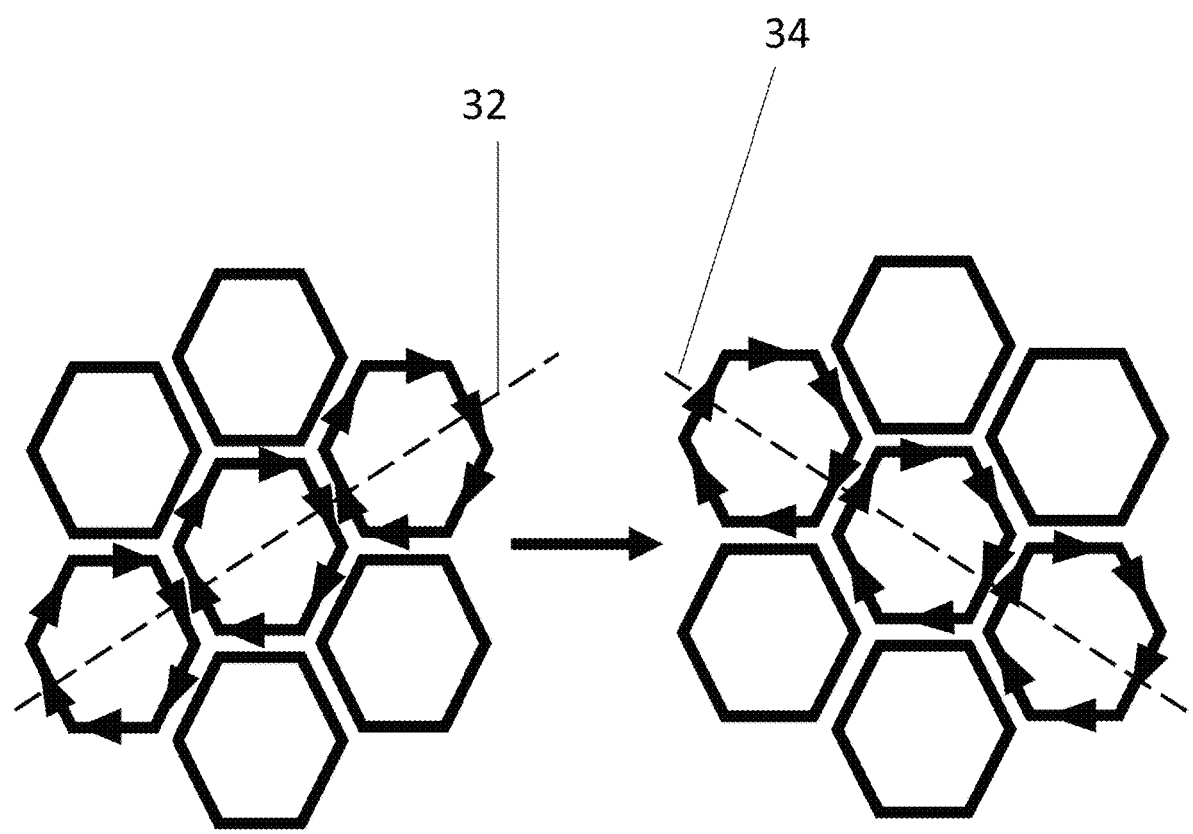
FIG. 3 illustrates a configuration of coils of an eddy current probe according to another embodiment of the present invention.

FIG. 3 illustrates a configuration of coils of an eddy current probe according to another embodiment of the present invention. Instead of sequentially activating coils in a ring around a central axis, the coils are activated along a first line 32. The configuration in FIG. 3 is based on the idea that the magnetic field produced by two closely adjacent parallel wires with oppositely directed current is approximately zero. This effect allows a group of closely adjacent coils to produce a magnetic field approximately equivalent to a single larger coil (with a perimeter defined approximately as the outside perimeter of the collection of closely adjacent coils), as discussed in the paper "A Smart Eddy Current Sensor Dedicated to the Nondestructive Evaluation of Carbon Fibers Reinforced Polymers" by Naidjate et al., which is incorporated herein by reference in its entirety. Activating different sets of closely adjacent coils therefore has an equivalent effect to rotating the single larger coil. By rotating the line along which the coils are activated to a second line 34, the overall field produced by the probe is able to be rotated, allowing different angles to be evaluated without physically turning or moving the probe. One of ordinary skill in the art will appreciate that although FIG. 3 shows the coils as hexagons, coils of any shape are able to be used for the present invention, including triangular, circular, and rectangular coils, among others. Additionally, one of ordinary skill in the art will understand that although FIG. 3 shows 7 total coils, the present invention is able to utilize a greater number of coils, and, in some instances, a far greater number of coils. In one embodiment, the total number of coils is greater than 20. In another embodiment, the total number of coils is greater than 100. In another embodiment, fewer than 7 total coils are able to be used.

The process of moving the effective pole by sequentially activating transmitter coils is known as synthetic rotation. However, the present invention is not limited to utilizing synthetic rotation. In one embodiment, the system physically rotates one or more transmitter coils around a central axis.

Figure 4:
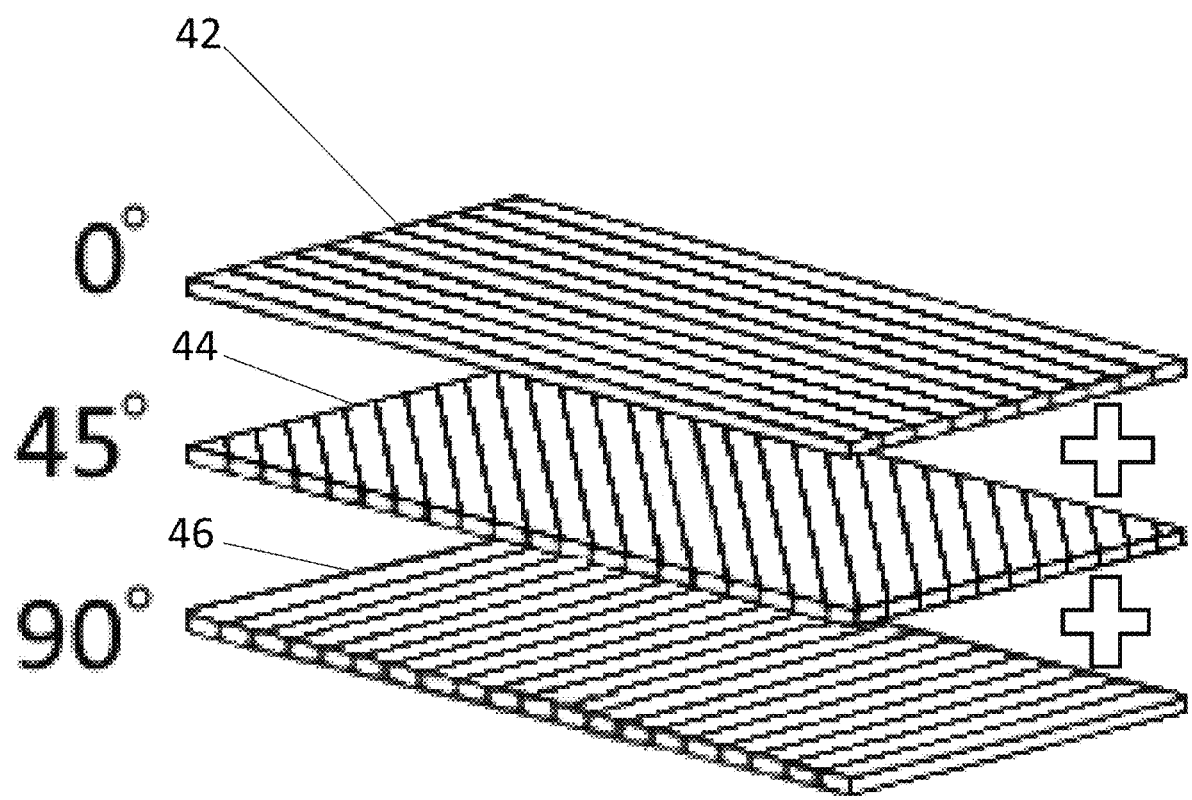
FIG. 4 illustrates layers of a test object having different fiber orientations according to one embodiment of the present invention.

FIG. 4 illustrates layers of a test object having different fiber orientations according to one embodiment of the present invention. In a preferred embodiment, an eddy current probe is used to scan a layered composite part (e.g., made from carbon fiber, and/or other composite materials) from a single external surface. Composite materials generally include a polymer matrix with reinforcing fibers extending through the polymer matrix. Alternatively, composite materials include a metal matrix with ceramic fibers, a carbon matrix with carbon fibers, and/or other configurations of matrix and fibrous materials. Some composite materials include layers wherein all or substantially all the fibers in the layer extend in a single direction (i.e., unidirectional fabric layers), while other composite materials include layers where fibers are woven and therefore extend in more than one direction. The conductivity of composite materials is influenced by the alignment of the fibers within each layer, such that composite materials tend to demonstrate an anisotropic conductivity, especially in those composites with unidirectional fiber orientations. Unexpectedly, this anisotropy allows eddy current techniques to determine ply orientation of a composite material, as the eddy currents are sensitive to the differences in the conductivity of the composite material.

Figure 5:
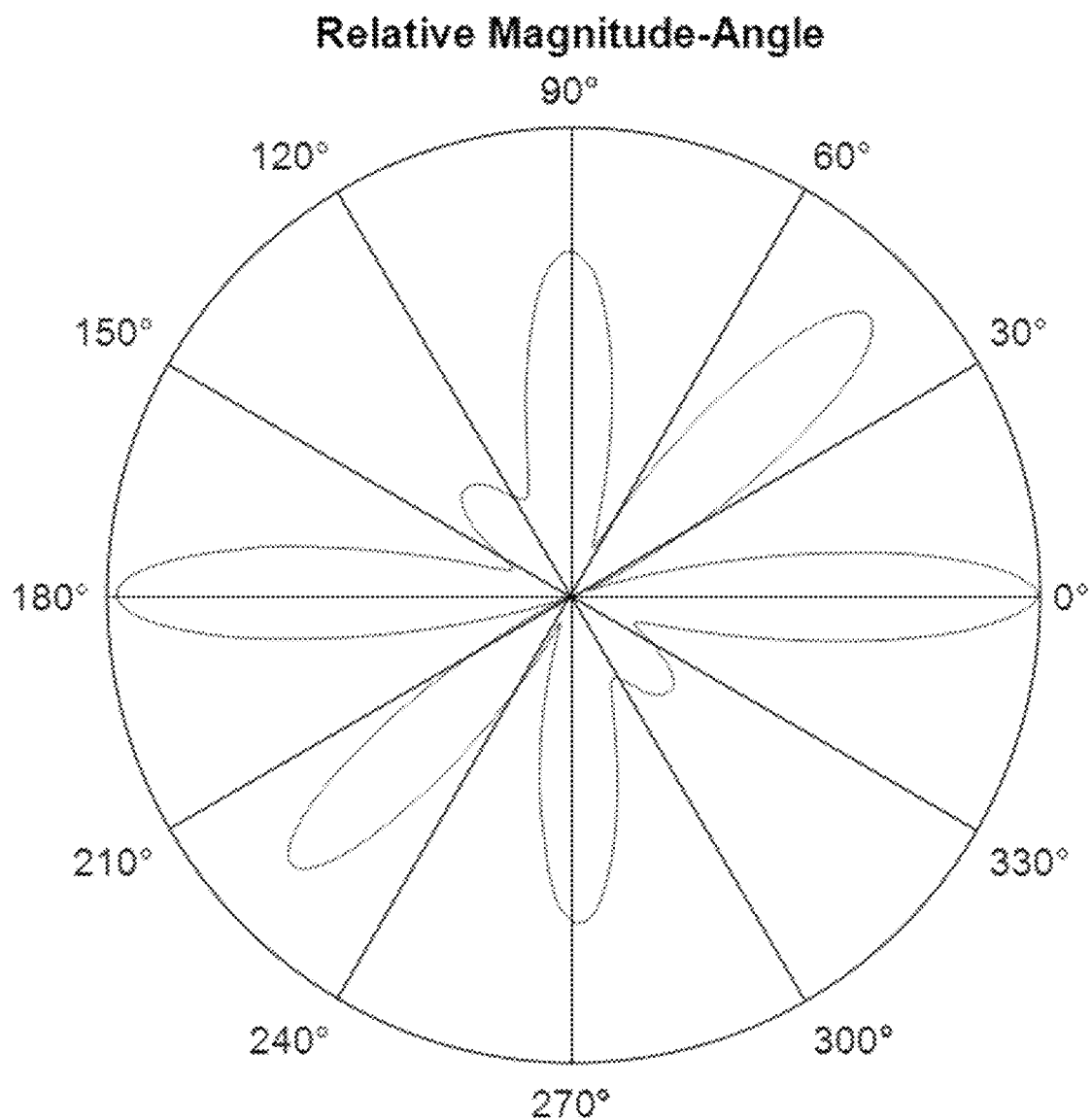
FIG. 5 is a diagram of the results of an eddy current probe test of a material with a plurality of unidirectional fiber orientations, plotting magnitude versus angle according to one embodiment of the present invention.

As shown in FIG. 4, composite materials are often layered, including layers wherein fibers are aligned in different directions. FIG. 4 shows one layer having fibers aligned at 0°, a second layer having fibers aligned at 45°, and a third layer having fibers aligned at 90°. FIG. 5 is a diagram of the results of an eddy current probe test of a material with a plurality of unidirectional fiber orientations, such as that shown in FIG. 4. FIG. 5 shows high amplitude signals along 0°, 45°, and 90°, accurately reflecting the ply orientations of the part. Advantageously, the diagram shown in FIG. 5 is able to be generated without moving the eddy current probe, allowing the eddy current probe to determine ply orientation after scanning at a single location. The probe is capable of doing this, as the circular excitation of the coils (or the overall circular movement of the effective pole of the coils) allows the probe to detect along which axes higher conductivity is exhibited, and therefore which directions the fibers are aligned. Importantly, the probe is not limited to only producing a number of data points equal to the number of transmitter coils, as activating more than one coil simultaneously to move the effective pole of the coils allows for amplitude values to be detected for intermediate points between the coils. The ability to determine ply orientation while scanning a single point for a unidirectional lamina laminate provides an improvement over ultrasonic methods of ply detection, which require that a larger area of the test object is scanned in order to determine ply orientation. Furthermore, the present invention provides an advantage even for a weave lamina laminate by allowing the fiber directionality to be determined by scanning an area smaller than would be required by existing ultrasonic methods. In one embodiment, the system is able to determine that a ply with a first fiber alignment is closer to the surface or further from the surface than one or more plies having different fiber alignments. In one embodiment, this is determined based on the relative magnitude of the peaks for each fiber alignment. Typically, fiber alignments demonstrating a greater magnitude indicate fiber alignments closer to the testing surface of the part.

Figure 6:
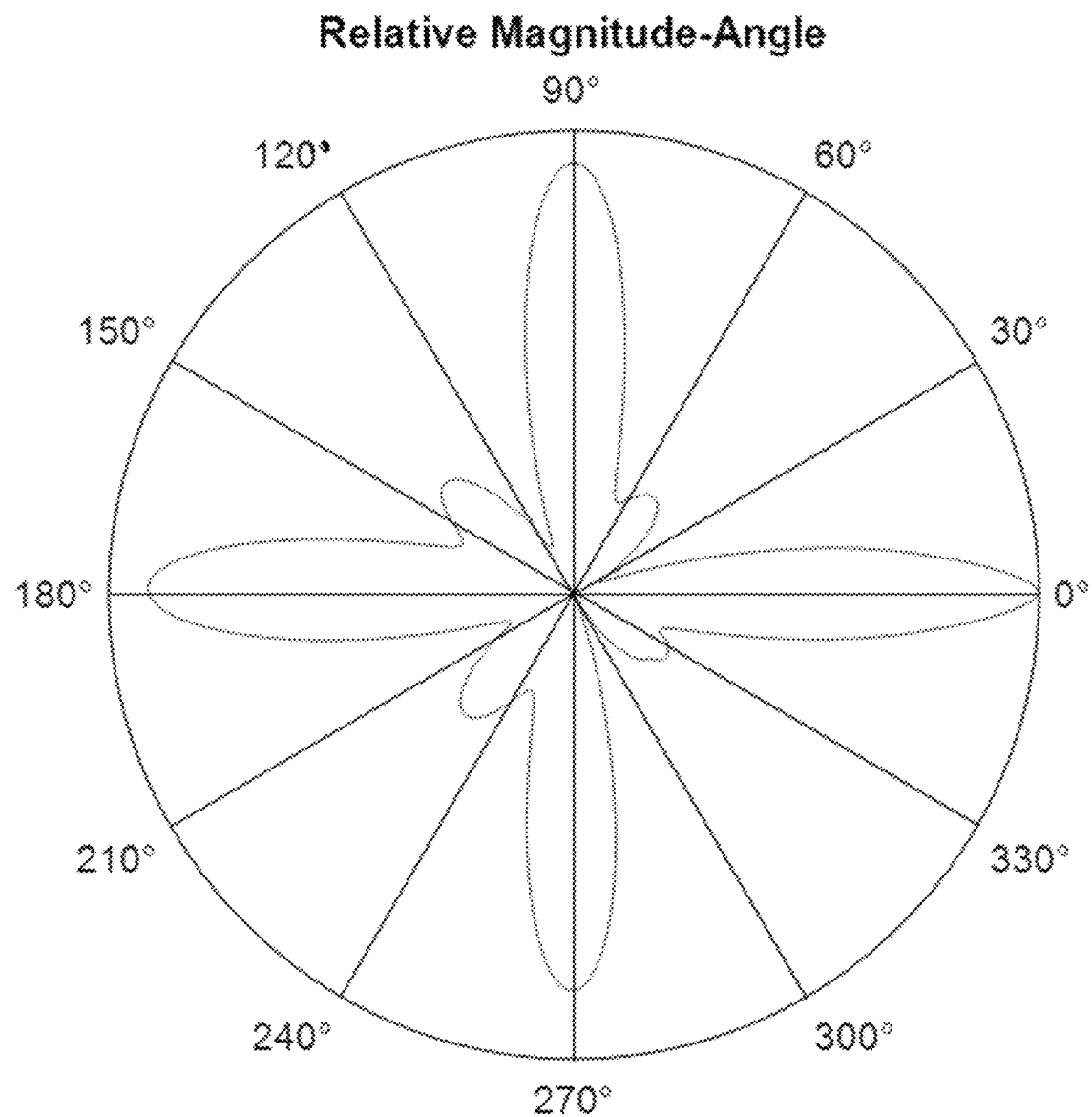
FIG. 6 is a diagram of the results of an eddy current probe test of a material with a plurality of weave fiber orientations, plotting magnitude versus angle according to one embodiment of the present invention.

FIG. 6 is a diagram of the results of an eddy current probe test of a material with a plurality of weave fiber orientations, plotting magnitude versus angle according to one embodiment of the present invention. For weave layers of the composite, the anisotropy of the conductivity is less pronounced, as shown by the smaller peaks at approximately 30°, 120°, 210°, and 300°. In one embodiment, the system is able to determine the type of weave (e.g., plain, twill, satin, etc.) in addition to the orientation of the fibers in each weave.

The use cases of the present invention are not limited to determining ply orientation. For example, the eddy current probe is capable of detecting lightning strike materials in aerospace parts, as lightning strike materials most commonly are metal meshes or embedded arrays within a part that are conductive, and therefore are detectable by the eddy current probe. Additionally, the eddy current probe is capable of detecting foreign objects within a test object, especially conductive foreign objects, such as metallic backings used in manufacturing that have been left within the part. The eddy current probe is further capable of examining conductive or semiconductive surface coatings of a part, such as paint, sealants, and/or functional coatings. Specifically, the eddy current probe is sensitive to cracks in a surface coating and operable to detect the thickness variations of the surface coating. The system is also capable of inspecting printed circuitry elements and of inspecting surface patterns on materials, including additively manufactured materials. Furthermore, the present invention is not limited to use for fiber-reinforced composites, but is also capable of being used with layered materials that alternate between layers of different conductivity (e.g., plastic and metal layers, composite and metal layers, etc.), composite-to-metal joints, and/or any other sort of hybrid structure with elements having different conductivities.

For a conductive coating, the thickness of a surface coating, as the coating typically has a different conductivity than the material that it is coating (i.e., typically the coating is more conductive). The field induced in the coating depends on thickness of the coating and the variations in the field are therefore able to be sensed by the system. Therefore, the system detecting relative variations in thickness does not require calibration. For a non-conductive coating, when the probe is pressed against the surface of the part, the thickness of the coating is essentially synonymous with a liftoff distance from the substrate (e.g., the material beneath the coating), where the liftoff distance is detectable based on the signals received by the at least one receiver coil. Variations in the distance from the substrate produce variations in the detected induced field. In another embodiment, the system is calibrated with a reference standard in order to determine an actual thickness of the coating at one or more points on the part. In one embodiment, data from reference standards is used to train an artificial intelligence module to determine the actual thickness of coatings on different parts based on the received signal data.

Detecting the thickness of the surface coating is particular useful in combination with ultrasonic testing. Ultrasonic sensors are typically not accurate in measuring the thickness of thin coatings, but are able to measure the total thickness of a substrate for the sections other than the surface coating and, occasionally, one or more plies closest to the surface of the substrate. Therefore, by combining eddy current data and ultrasonic data according to the present invention, the total thickness of the substrate is able to be more accurately determined.

Figure 7:
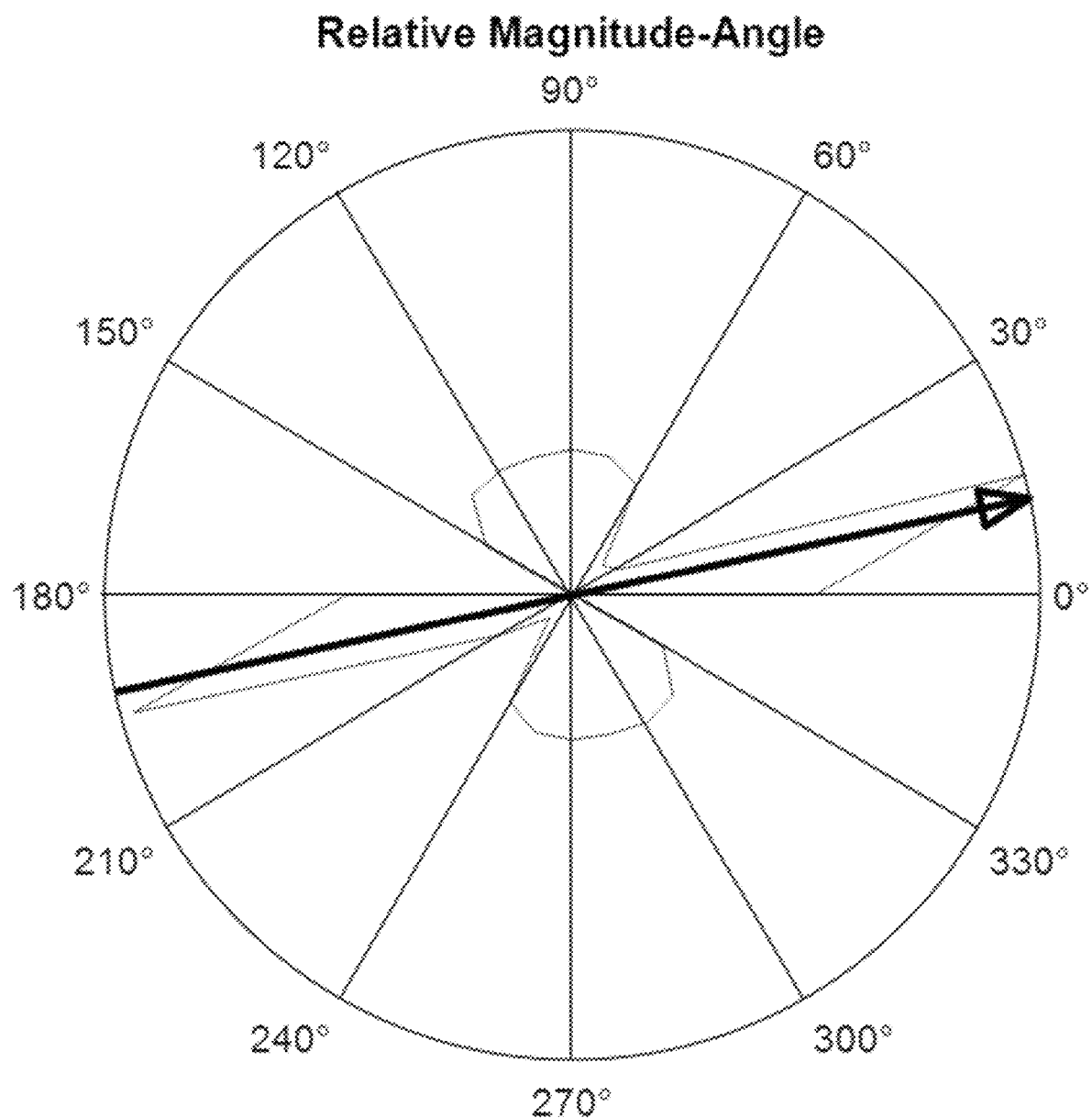
FIG. 7 is a diagram of the results of an eddy current probe test at a particular position along a material, plotting magnitude versus angle and generating an estimated fiber orientation according to one embodiment of the present invention.

FIG. 7 is a diagram of the results of an eddy current probe test at a particular position along a material, plotting magnitude versus angle and generating an estimated fiber orientation according to one embodiment of the present invention. FIG. 7 shows results for a material with laminae having a single fiber orientation, indicated by the arrow. In one embodiment, the system is operable to automatically determine the fiber orientation by polar-domain averaging the three largest probe magnitudes of the scan at each location. In one embodiment, for materials having a plurality of fiber orientations, the system is automatically able to determine a plurality of fiber orientations and tag each fiber orientation with indicia indicating how far laminae having the identified fiber orientations are from the surface. By way of example and not limitation, in one embodiment, the system identifies three fiber orientations in a single scan and indicates one orientation as #1 (indicating it is closest to the surface of the part), a second orientation as #2, and a third orientation as #3. In one embodiment, determination of proximity to the surface of the material is made based on the relative maximum amplitude of the values corresponding to each fiber orientation (with higher relative amplitudes more likely to be closer to the surface). Indicating each fiber orientation with indicia is useful for comparing amplitudes between adjacent scan locations, which have slightly different fiber orientations for what is likely the same layer.

Figure 8:
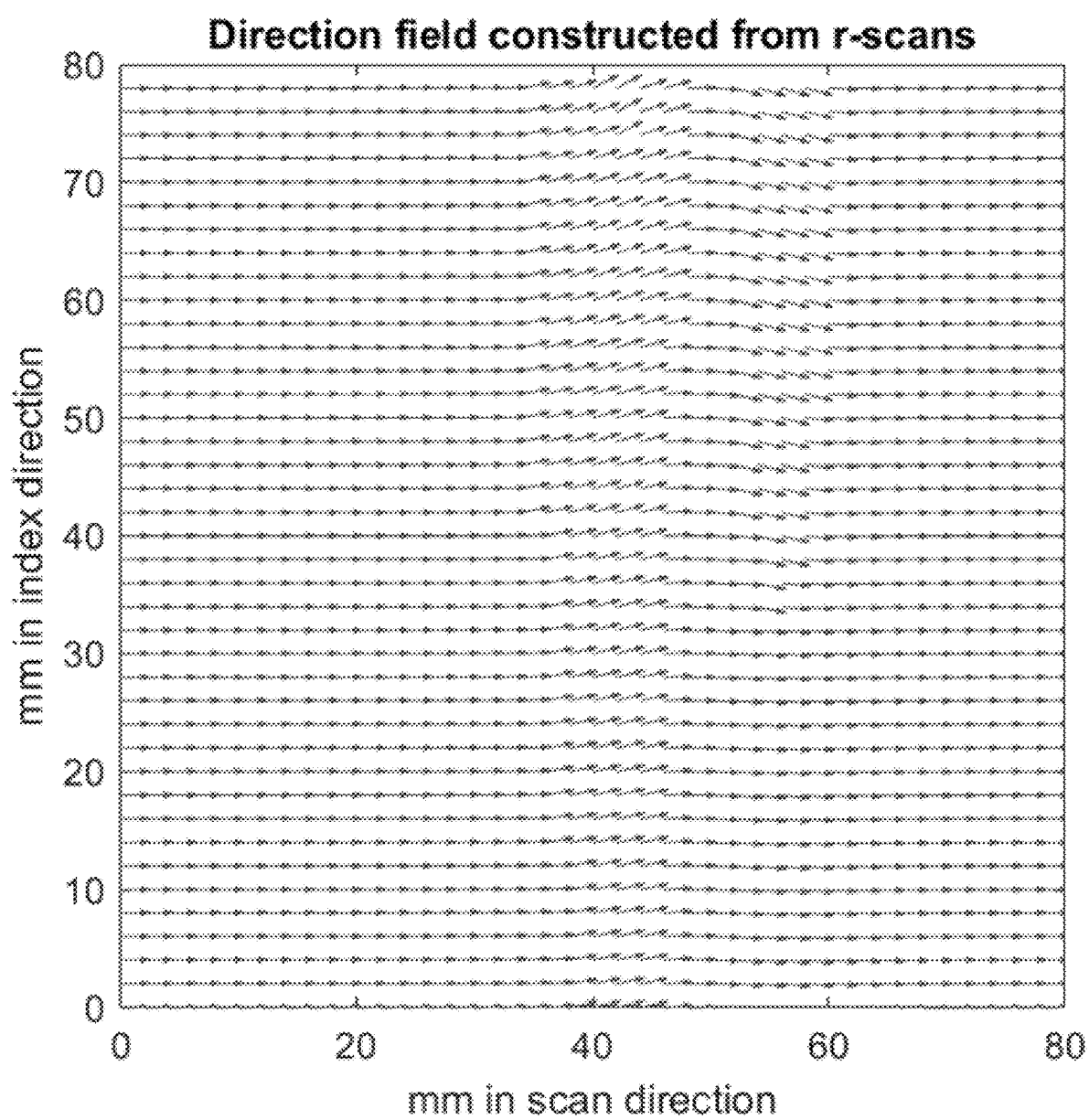
FIG. 8 is a diagram showing an aggregation of eddy current scans along a surface of a material, showing changes in fiber orientation along the material according to one embodiment of the present invention.

FIG. 8 is a diagram showing an aggregation of eddy current scans along a surface of a material, showing changes in fiber orientation along the material according to one embodiment of the present invention. In one embodiment, the system is operable to automatically aggregate individual scans such as that shown in FIG. 7 to create a map of the scanned material, wherein vectors showing fiber orientation at each position are shown, creating a vector field. In one embodiment, if the material had more than one identified fiber orientation, each labeled with corresponding indicia, separate maps are created for each indexed layer of the material (e.g., one map is created plotting all orientations indexed with #1, one map is created plotting all orientations indexed with #2, etc.). In this way, the system is capable of identifying fiber orientations across a material, and within different layers of the material. Generating a vector field of fiber orientations is useful particularly for showing in-plane waviness (i.e., in-plane wrinkles) within the material, as the fiber orientations will be slightly misaligned where there is waviness in the layer.

Figure 9:
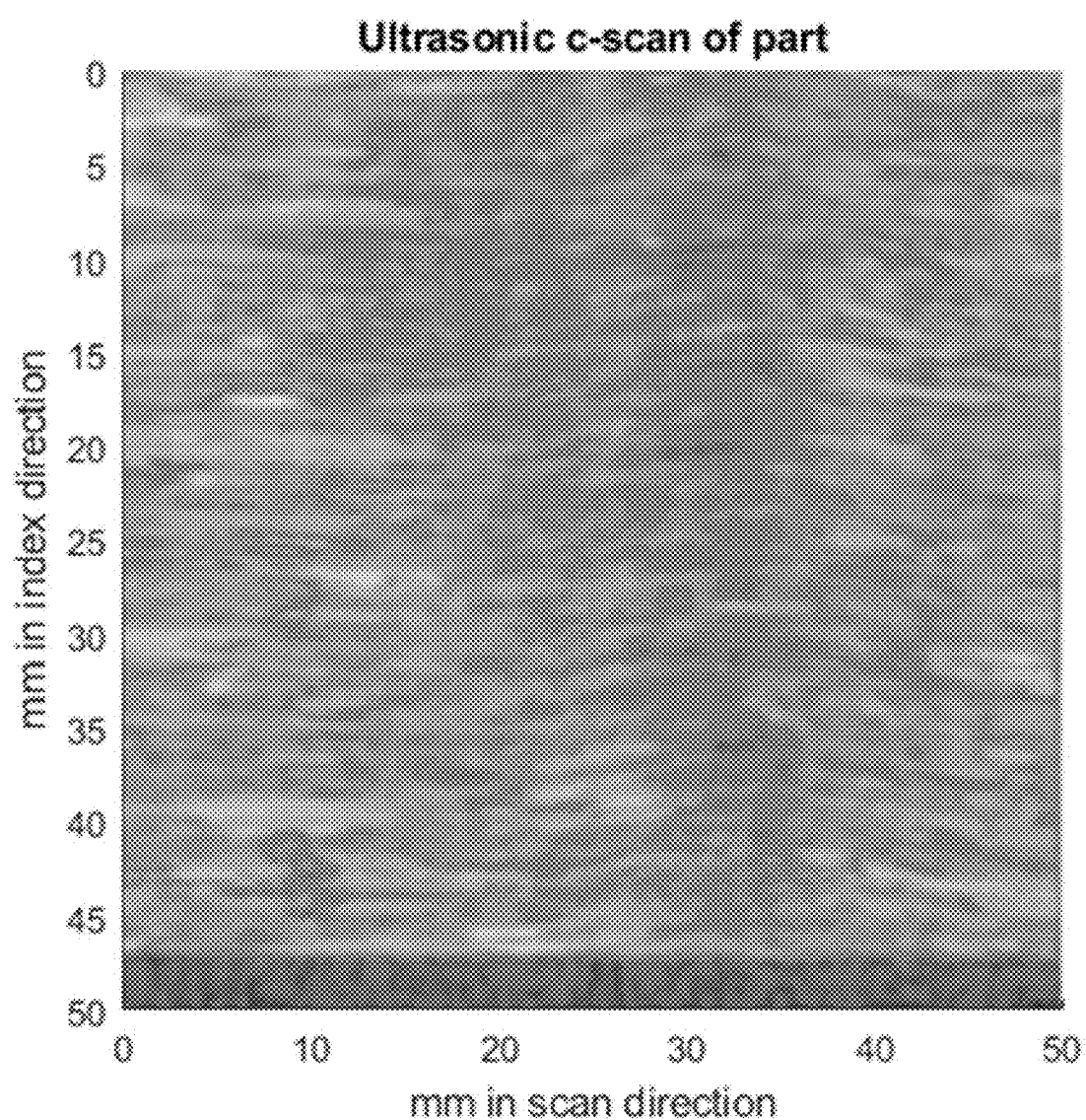
FIG. 9 is a diagram showing an ultrasonic C-scan of a material according to one embodiment of the present invention.

FIG. 9 is a diagram showing an ultrasonic C-scan of a material according to one embodiment of the present invention. The ultrasonic C-scan shown in FIG. 9 is taken near the surface of the part, where ultrasonic scans have difficulty due to large amounts of noise. The blurriness of ultrasonic C-scans near the surface of a part demonstrates the necessity to incorporate eddy current scan data for fully characterizing the part.

Figure 10:
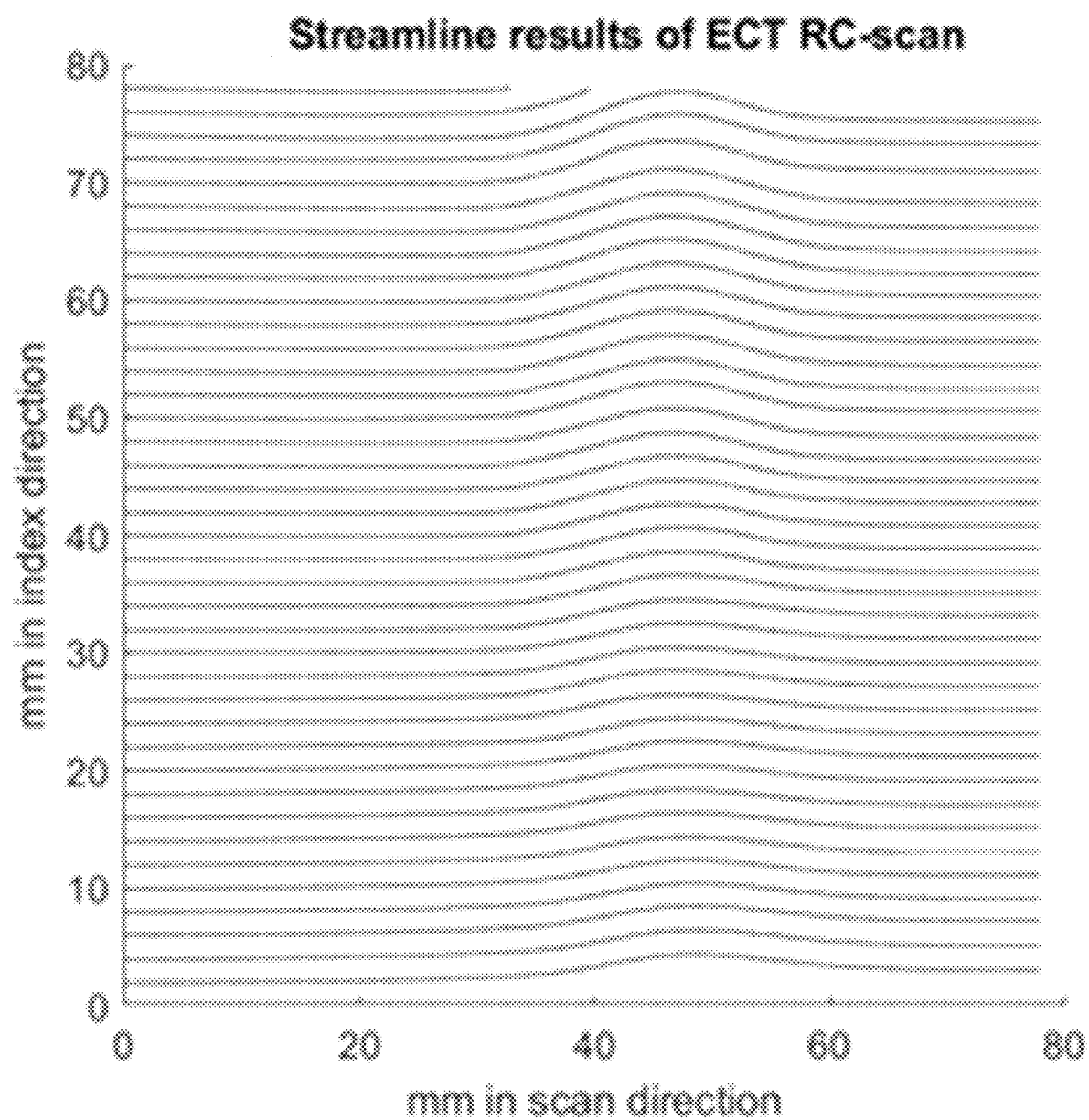
FIG. 10 is diagram showing a streamline representation of an eddy current scan of a material according to one embodiment of the present invention.

FIG. 10 is diagram showing a streamline representation of an eddy current scan of a material according to one embodiment of the present invention. In one embodiment, the system is operable to automatically generate a streamline diagram of each layer of the part based on the fiber orientations identified at each location along the surface of the part. The streamline diagram provides a marked improvement over systems only using ultrasonic scan data, especially for identifying in-plane waviness in layers near the surface of the part.

Figure 11:
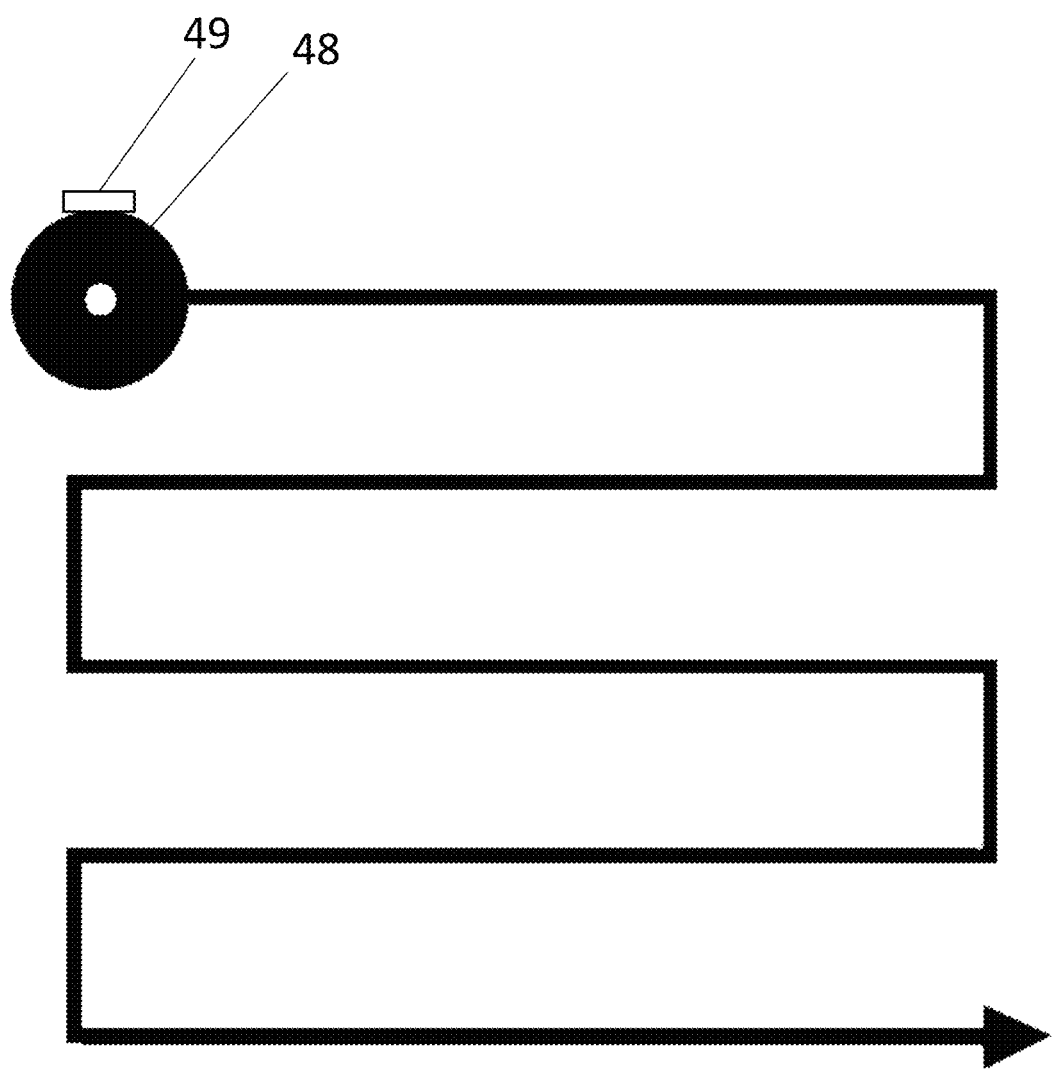
FIG. 11 illustrates a pattern for a raster scan of a test object according to one embodiment of the present invention.

FIG. 11 illustrates a pattern for a raster scan of a test object according to one embodiment of the present invention. In one embodiment, the probe 48 is moved along a surface of the test object so as to gather signal data from wider area of the test object. The signal data (e.g., amplitude and phase data) is saved to at least one database in communication with the probe. In one embodiment, a motion sensor 49 and/or an encoder (e.g., an optical encoder, a magnetic encoder, etc.) detects the relative position of the probe 48 and generates location data associated with the signal data. Combining the location data with the signal data allows a scan image of the part to be produced, analogous to a C-scan in ultrasonic testing. One of ordinary skill in the art will understand that methods of obtaining location data to pair with the signal data are not intended to be limited. By way of example and not limitation, in one embodiment, the step size of a motor used to translate the probe 48 is known and therefore the distance moved by the probe is known based on the number of steps moved by the motor.

In one embodiment, the end effector of the present invention is attached to a robotic arm and/or a translation stage operable to move the end effector across the surface of a test object in order to perform a scan. In one embodiment, the end effector is attached to a crawler robotic and/or an unmanned aerial vehicle (UAV) operable to move the end effector across the surface of a test object in order to perform a scan.

In one embodiment, an in-phase/quadrature (I/Q) demodulator is used for the signal received from the eddy current probe. While data is often presented as being received on a single channel, in practice, a demodulated signal always includes real and imaginary components, also termed the in-phase and quadrature components respectively. In one embodiment, as the signal is demodulated into in-phase and quadrature components, a low-pass filter is applied to filter out high frequency noise and increase the signal-to-noise ratio for the received signal. In one embodiment, the I/Q demodulation is performed according to methods known in art, such as that discussed in U.S. Pat. No. 7,560,920, which is incorporated herein by reference in its entirety. By using I/Q demodulation and filtering out high frequency signals, a more accurate and higher resolution image of the part is able to be obtained. Furthermore, filtering out high frequency signals allows sampling to occur at a lower frequency, reducing the total cost of the system due to the system not requiring very highly sophisticated sensor technology.

Figure 12:
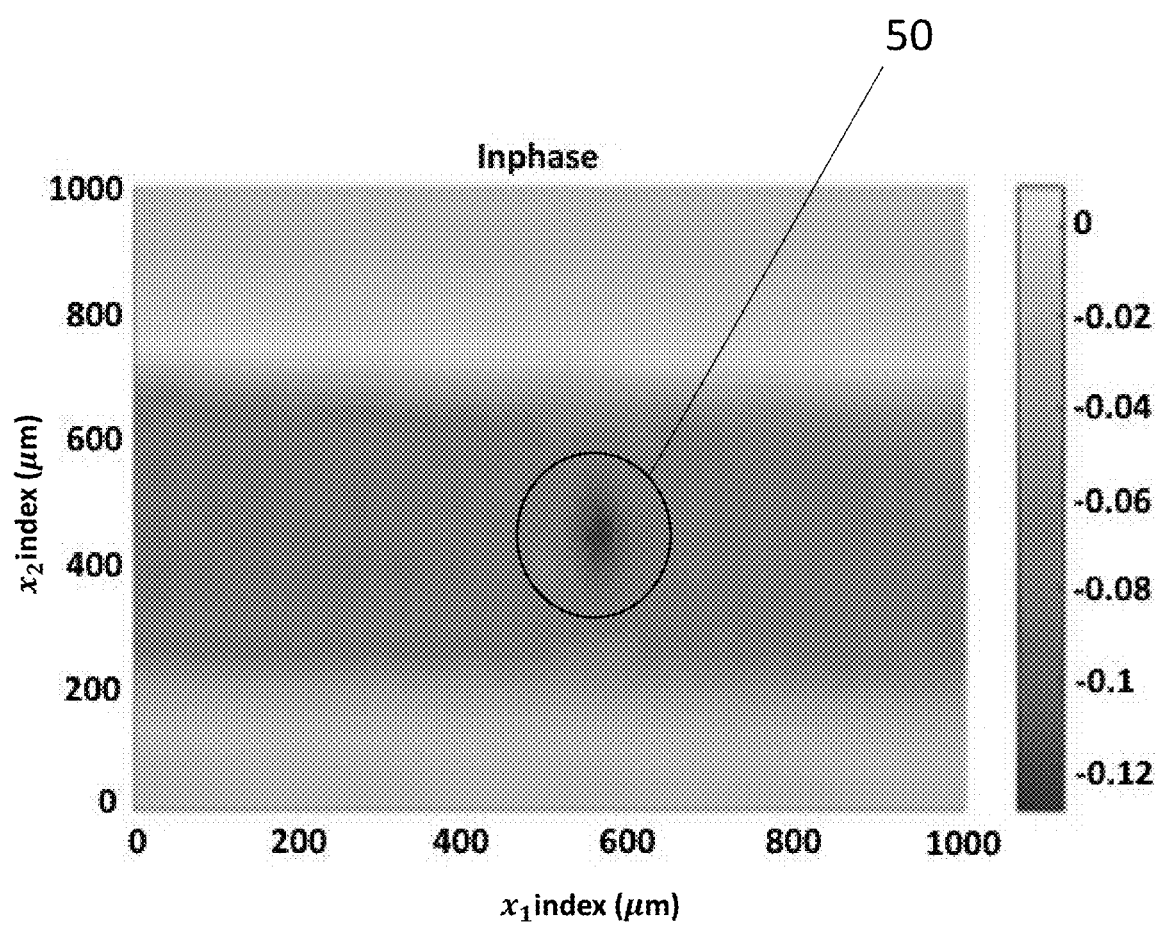
FIG. 12 is a scan image of a part including a crack, showing the inphase component of an eddy current probe signal according to one embodiment of the present invention.
Figure 13:
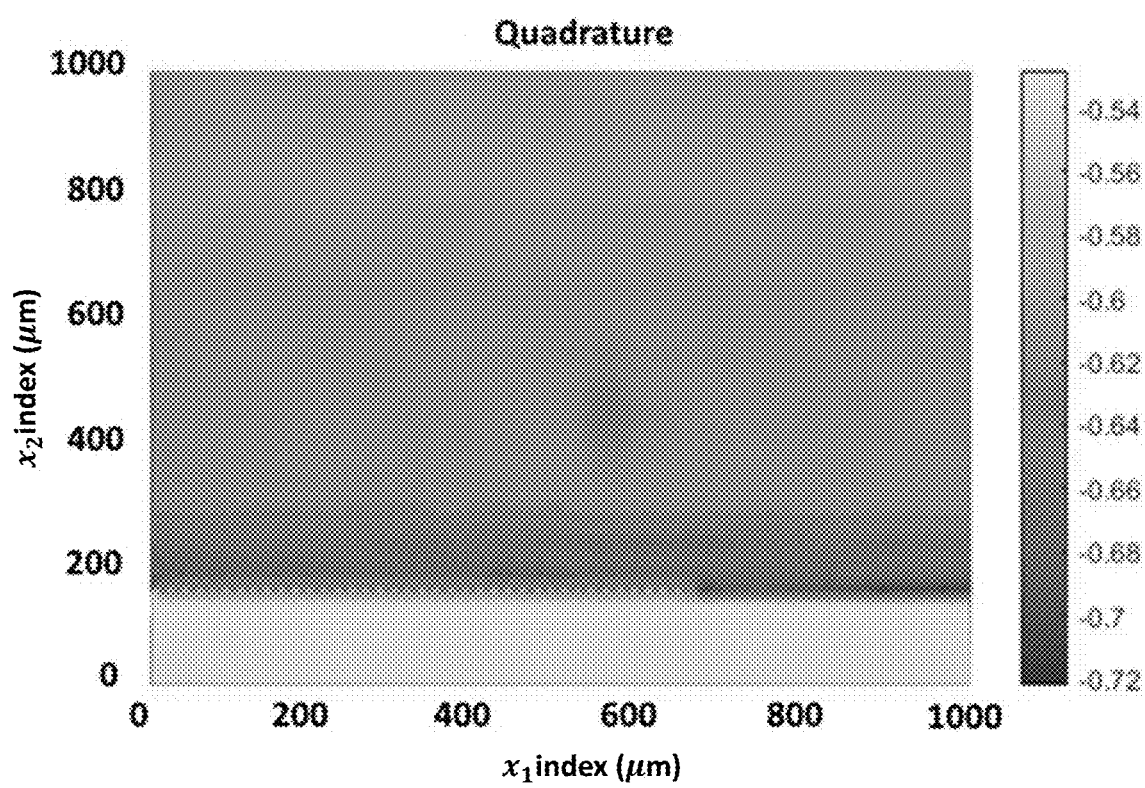
FIG. 13 is a scan image of the part shown in FIG. 12, showing the quadrature component of an eddy current probe signal according to one embodiment of the present invention.
Figure 14:
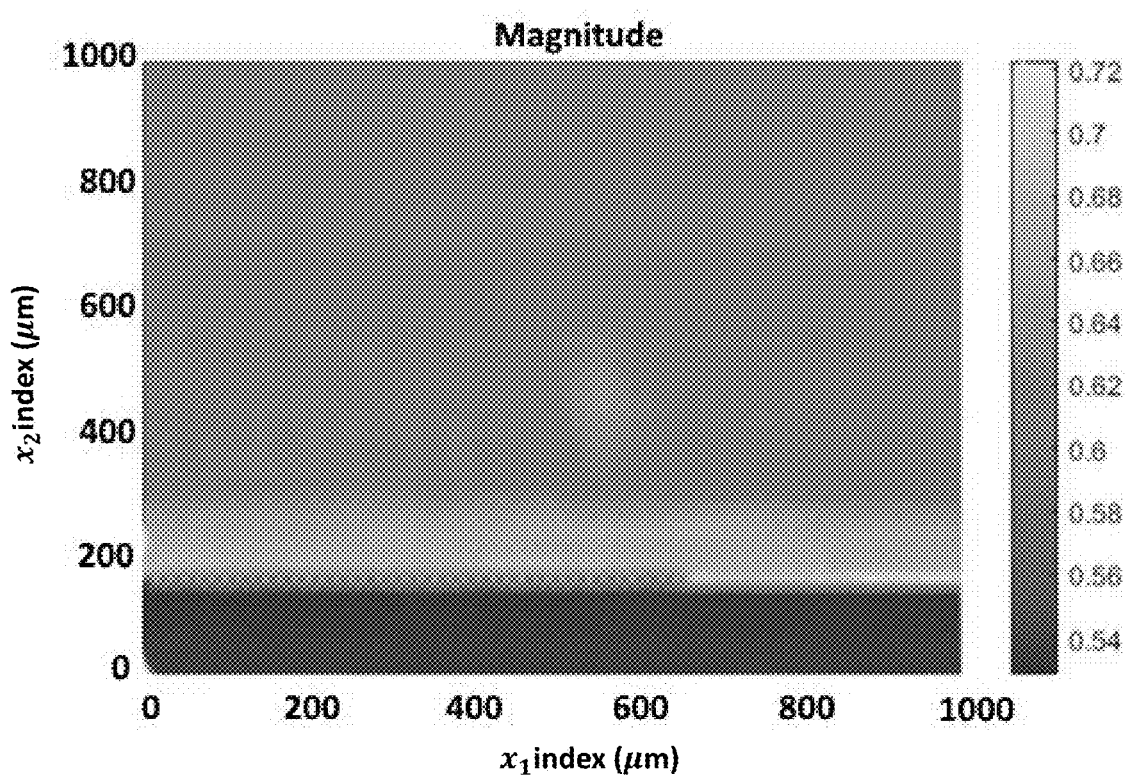
FIG. 14 is a scan image of the part shown in FIG. 12, showing the magnitude of the eddy current probe signal according to one embodiment of the present invention.
Figure 15:
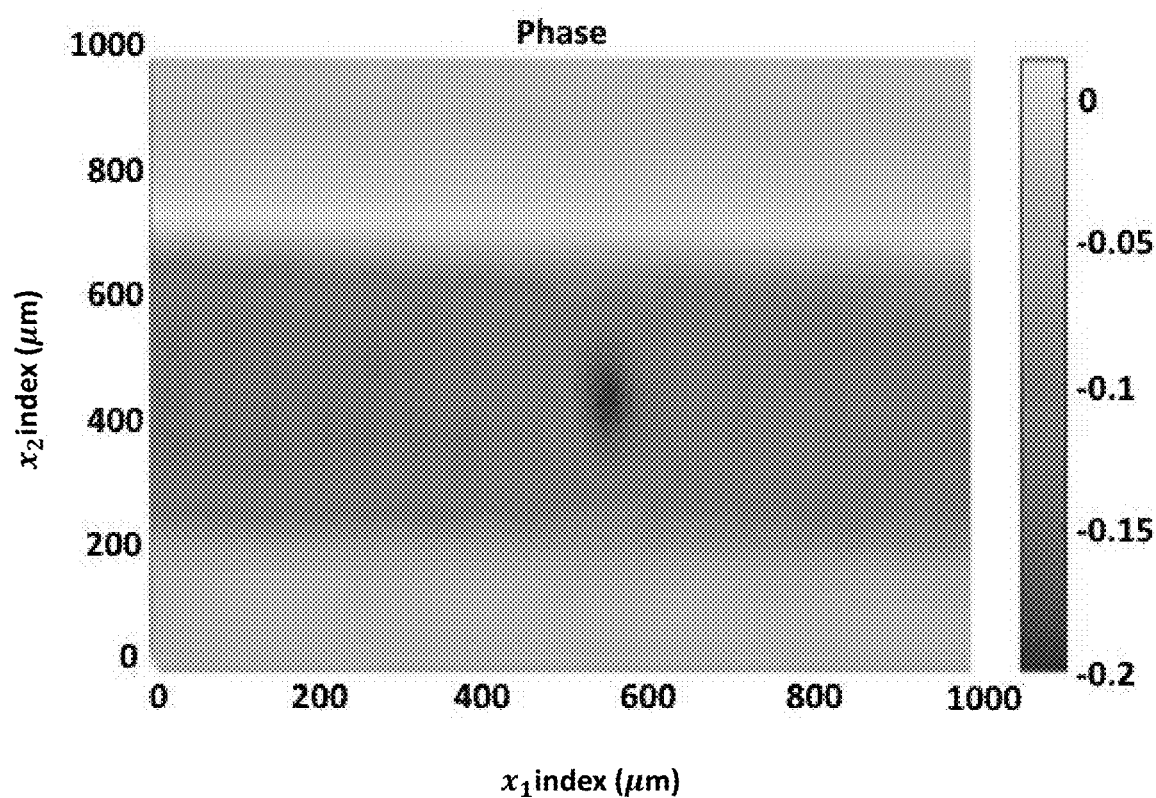
FIG. 15 is a scan image of the part shown in FIG. 12, showing the phase of the eddy current probe signal according to one embodiment of the present invention.

FIG. 12 is a scan image of a part including a crack, showing the in-phase component of an eddy current probe signal. By plotting the filtered in-phase component of the signal data, the presence and location of a crack 50 is able to be determined. Additionally, or alternatively, scan images are able to be generated showing the quadrature component of an eddy current probe signal, as shown in FIG. 13, the magnitude of the eddy current probe signal, as shown in FIG. 14, and/or the phase of the eddy current probe signal, as shown in FIG. 15. In a preferred embodiment, the magnitude and/or phase of the eddy current probe signal is the magnitude and/or phase of the signal after it has been filtered by the low-pass filter. In another embodiment, the magnitude and/or phase of the eddy current probe signal is the magnitude and/or phase of the signal before it has been filtered by the low-pass filter. The magnitude M cand the phase P are able to be calculated as a combination of inphase and quadrature signals as described by various equations, including but not limited to Equations 1 and 2 below:

$$M = \sqrt{I^2 + Q^2} \quad \text{(Equation 1)}$$

$$P = \tan^{-1}\frac{Q}{I} \quad \text{(Equation 2)}$$

The present invention is not limited to analysis of the magnitude or phase of the inphase and quadrature channels, and one of ordinary skill in the art will understand that a variety of mathematical functions incorporating the inphase and quadrature channels are able to be used to analyze the orientation of each ply.

In one embodiment, the eddy current probes of the present invention are driven by an alternating current with a frequency of between about 10 MHz and about 30 MHz. In one embodiment, the alternating current has a frequency greater than 10 MHz. In one embodiment, the alternating current has a frequency of about 20 MHz. Operating at a frequency greater than 10 MHz is unusual for eddy current non-destructive testing. For example, the article "Non-Destructive Techniques Based on Eddy Current Testing" by Garcia-Martin et al., Sensors (Basel) vol. 11, 3 (2011), which is incorporated herein by reference in its entirety, states that typical inspection frequencies in eddy current testing are in the range of 100 Hz to 10 MHz. The upper limit of this range is largely due to the inverse relationship between penetration depth and frequency, where higher frequency probes have a smaller penetration depth. Because eddy current probes are used primarily for testing metals, exceeding a frequency of 10 MHz typically results in an insufficiently small penetration depth and greater anomalies in the signal. However, for composite materials, such as carbon fiber, higher frequencies are required. For the purposes of this application, high frequency refers to a frequency greater than 10 MHz, which differs from another common definition of the term as referring to frequencies between 3 and 30 MHz.

Figure 16:
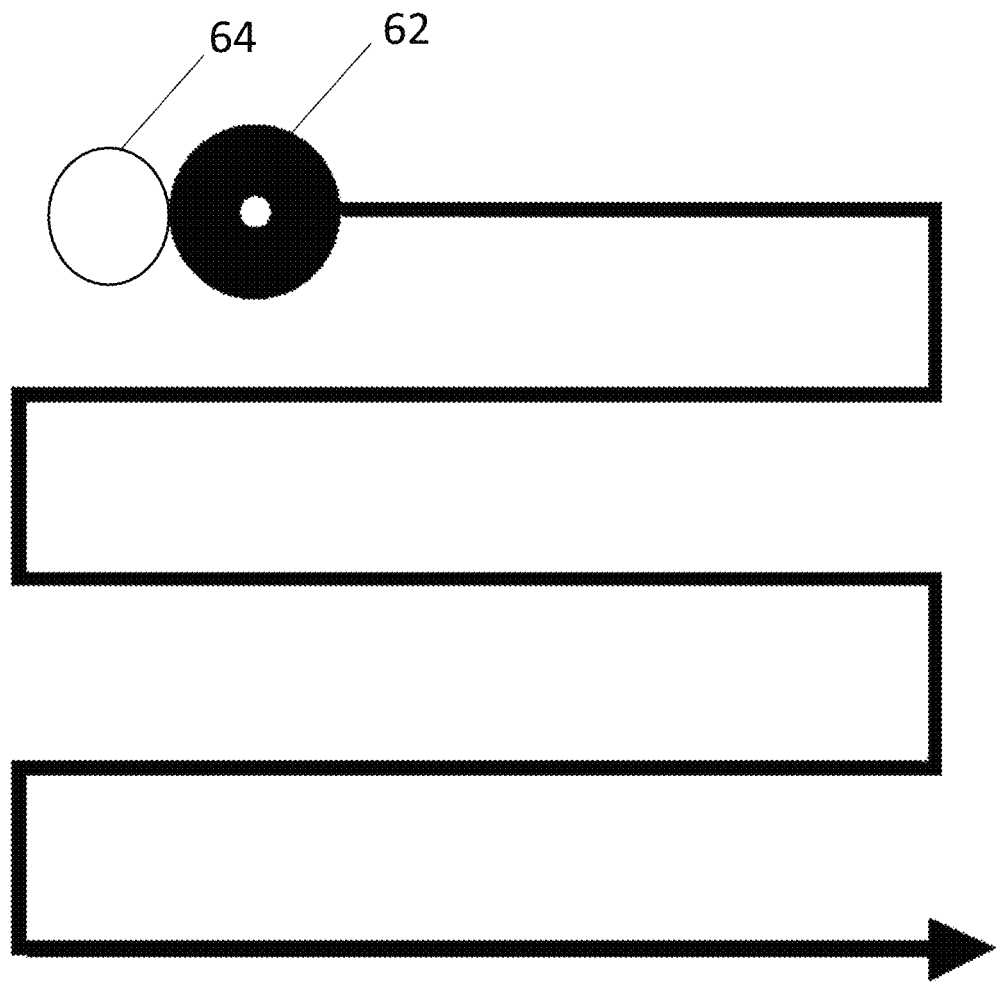
FIG. 16 illustrates a pattern for a raster scan of a test object using an eddy current probe and an ultrasonic probe according to one embodiment of the present invention.

In one embodiment, the eddy current probe is attached to and/or used in combination with an ultrasonic probe. In one embodiment, as shown in FIG. 16, the ultrasonic probe 64 is moved across the surface of the part in front of, beside of or behind the eddy current probe 62 such that both the eddy current probe 62 and the ultrasonic probe 64 scan the same areas of the part. The system described in the present invention is able to accomplish data fusion for the data produced by the eddy current probe 62 and the ultrasonic probe 64. Because the ultrasonic probe 62 in this embodiment is shifted relative to the eddy current probe 62, in one embodiment, a time and/or distance offset is applied to the data produced by the ultrasonic probe 64, in order to accomplish the data fusion. In this way, data from the ultrasonic and eddy current scans do not need to be combined after the fact, and are able to be combined in real time. In one embodiment, an initial scan by the eddy current probe is used to determine fiber alignment of the part, and the path for generating a raster scan is generated based on the fiber alignment of the part. In one embodiment, the ultrasonic probe 64 is operable to operate in either through-transmission or pulse echo modes.

Figure 17:
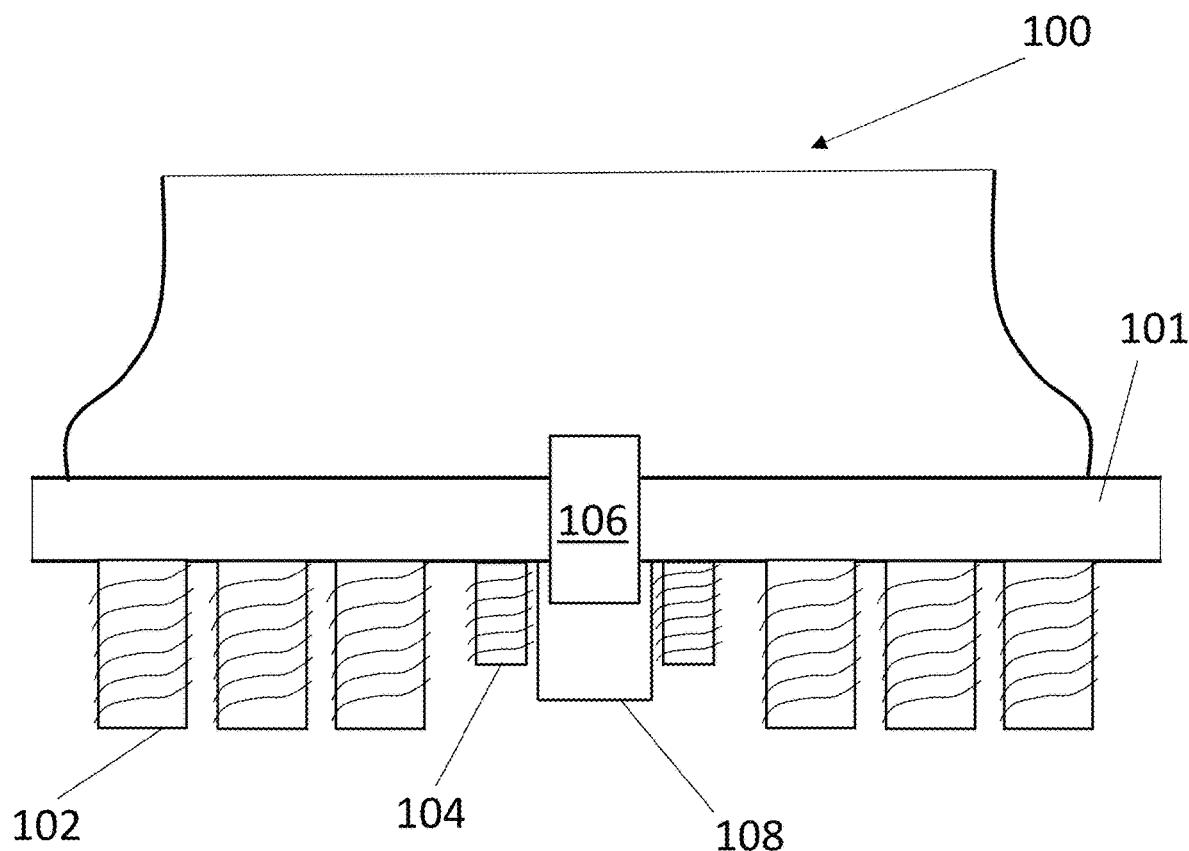
FIG. 17 is a side view of a probe including eddy current coils and an ultrasonic transducer according to one embodiment of the present invention.
Figure 18:
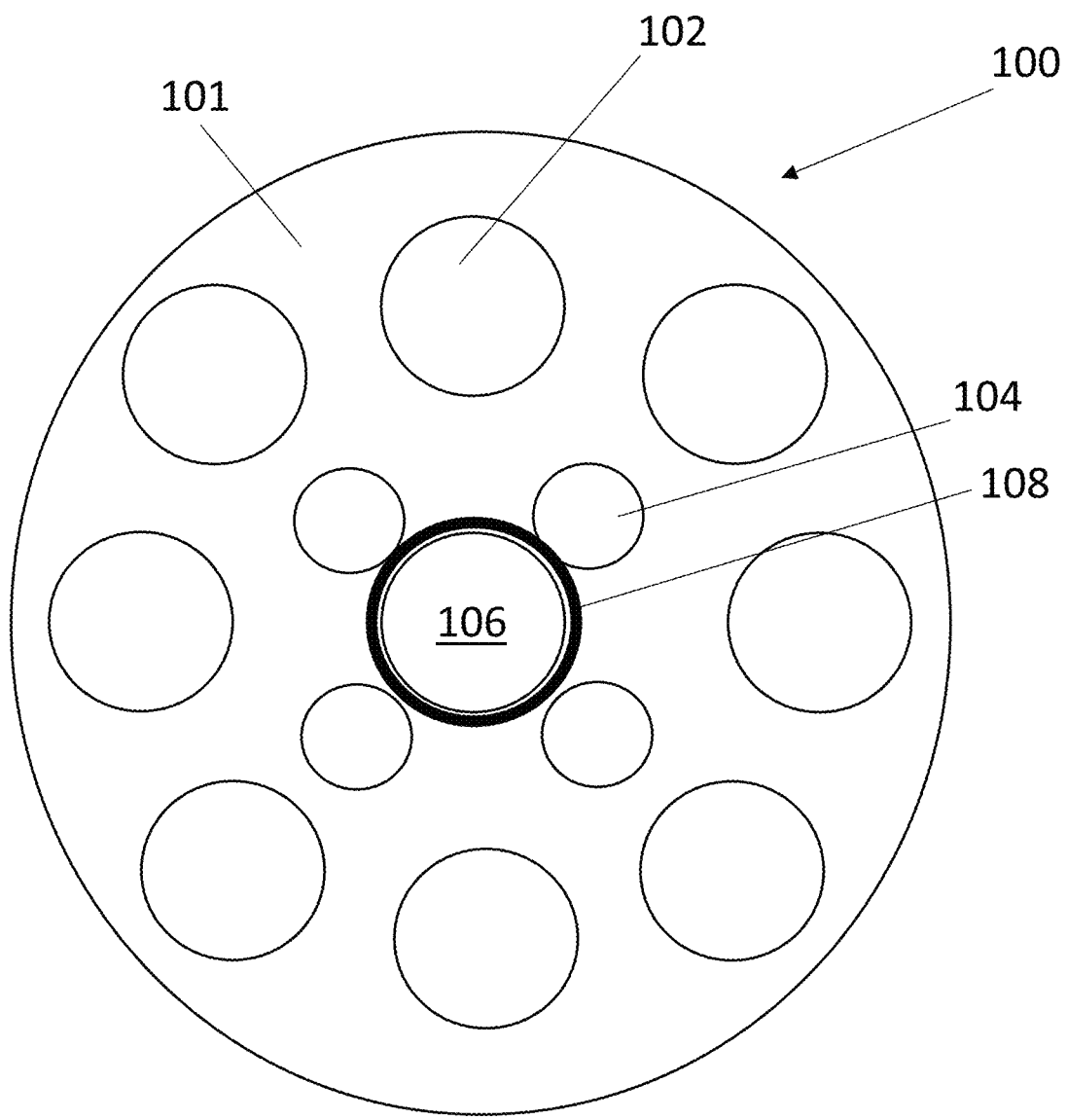
FIG. 18 is a bottom view of a probe including eddy current coils and an ultrasonic transducer according to one embodiment of the present invention.

FIG. 17 is a side view of a probe including eddy current coils and an ultrasonic transducer according to one embodiment of the present invention. In one embodiment, the probe 100 includes a ring of transmitter eddy current coils 102 extending outwardly from the surface of a base 101 and are located substantially equidistant from a center of a base 101. In one embodiment, the base 101 is substantially circular. In one embodiment, at least one receiver coil 104 for detecting eddy currents extends outwardly from the surface of the base 101 and are located radially inwardly relative to the transmitter eddy current coils 102. In one embodiment, as shown in FIG. 18, the probe includes a plurality of receiver coils 104 extending outwardly from the surface of the base 101 and positioned approximately equidistant from the center of the base 101. In one embodiment, the at least one receiver coil 104 is not located at the center of the base 101.

In one embodiment, the center of the base 101 defines a hole extending through the base 101. In one embodiment, an ultrasonic transducer 106 extends partially or wholly through the hole. In order to decrease the chances that eddy currents are formed in the ultrasonic transducer 106, in one embodiment, the probe 100 includes a screening layer 108 surrounding the hole in the center of the base. In one embodiment, the screening layer 108 is formed from an insulating material. In another embodiment, the screening layer 108 includes ferrite. In one embodiment, the screening layer 108 is formed from a magnetically conductive material, such that the screening layer 108 absorbs magnetic fields and does not permit magnetic fields to penetrate the screening layer, and eddy currents are therefore not induced in the ultrasonic transducer. In one embodiment, because the ultrasonic transducer 106 is collocated with the eddy current coils, a distance and/or time offset does not need to be applied between the eddy current data and the ultrasonic data.

In one embodiment, eddy current signals are used to determine a fiber alignment of one or more layers near the surface of the part (e.g., the top layer, the top two layers, the top three layers, etc.). In one embodiment, ultrasonic signals are used to determine fiber alignment of the part in layers further from the surface of the part (e.g., all but the top layer, all but the top two layers, all but the top three layers, etc.). In one embodiment, the ultrasonic signals are used to verify the fiber alignment determinations generated by the eddy current signals for the layers near the surface of the part. Ply orientation is determined for one or more layers of the material by first constructing a plurality of C-scan slices for the material based on signals received by the ultrasonic transducer and then applying a 2-dimensional transform (e.g., Radon transform, Hough transform, Fast Fourier Transform (FFT), Eigensystem analysis, etc.) to the C-scan slices, with the primary orientation being the highest resultant transform signal and a secondary orientation being a second highest transform signal. Systems and methods for determining fiber orientation for layers of a composite material using ultrasonic technology are further discussed in U.S. Patent Publication Nos. 2020/0333297 and 2021/0302373, each of which is incorporated herein by reference in its entirety.

Figure 19:
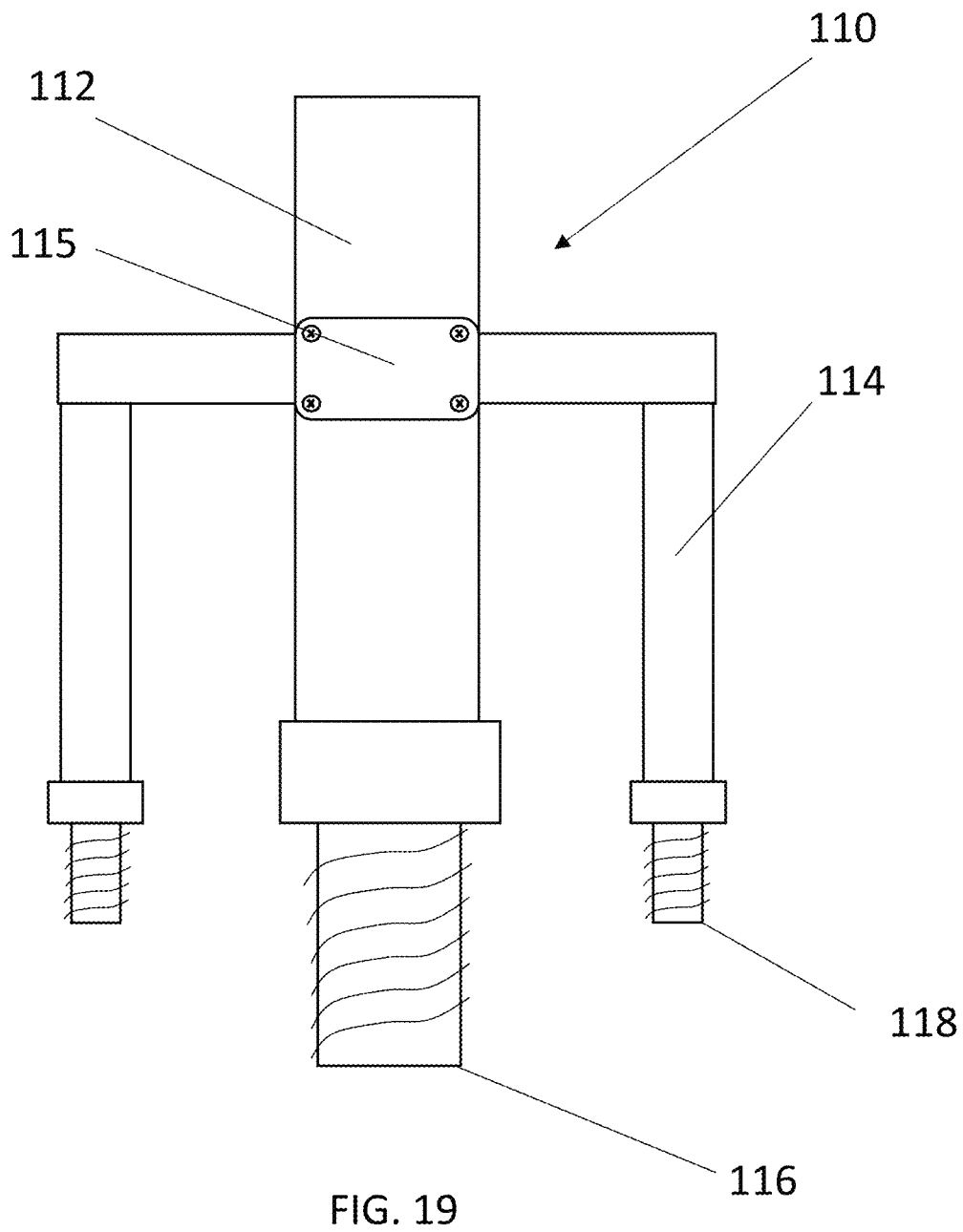
FIG. 19 illustrates a side view of an eddy current probe operable to physically rotate one or more transmitter or receiver coils around a central axis according to one embodiment of the present invention.

FIG. 19 illustrates a side view of an eddy current probe operable to physically rotate one or more transmitter or receiver coils around a central axis according to one embodiment of the present invention. In one embodiment, a probe 110 is operable to physically rotate one or more coils around a central axis rather than utilizing synthetic rotation. In one embodiment, the probe 110 includes a central stem 112 including at least one receiver coil 116 attached to an end effector region. In one embodiment, one or more peripheral arms 114 extend substantially parallel to the central stem 112. In one embodiment, each of the one or more peripheral arms 114 are attached to a common area 115 of the central stem 112. In another embodiment, the one or more peripheral arms 114 are attached to different areas of the central stem 112. An end effector region of each of the one or more peripheral arms 114 includes at least one transmitter coil 118. In another embodiment, the at least one coil 116 attached to the end effector of the central stem 112 is a transmitter coil and the at least one coil 118 attached to the end effector of the one or more peripheral arms 114 is a receiver coil. In one embodiment, the one or more peripheral arms 114 are rotatably attached to the central arm 112 such that the one or more peripheral arms 114 are able to rotate about the central arm 112, with the central arm 112 substantially defining a central axis of rotation. In this way, the probe 110 allows for physical rotation of one or more transmitter coils 118 about a receiver coil 116, or vice versa.

In one embodiment, the end effector of the central stem does not include only a single coil, but rather at least one ring of coils surrounding at least one central coil, as shown in FIG. 1. By way of example and not limitation, in one embodiment, the end effector of the central stem includes a central receiver coil and a surrounding ring of transmitter coils, while one or more transmitter coils are attached to the end of each of the one or more peripheral arms.

In another embodiment, the method of the present invention includes separate, unattached probes each having one or more transmitter or receiver coils. By way of example and not limitation, one or more of the separate, unattached probes are connected with at least one robotic arm operable to rotate at least one of the separate, unattached probes around the other. Therefore, the method of the present invention is not limited to utilizing a single probe to generate data.

In one embodiment, one or more peripheral arms 114 are rotating about a central axis, while the central stem 112 remains substantially still. By way of example and not limitation, in one embodiment, the probe 110 includes a single peripheral arm that is rotated 360° about the central axis. In another embodiment, the probe 110 includes two peripheral arms on opposite sides of the central stem 112, which are each rotated 180° in the same direction. In another embodiment, the two peripheral arms are each rotated clockwise and counterclockwise 90° such that a full 360° is scanned. One of ordinary skill in the art will understand that the present invention is not limited to one or two peripheral arms, but that the above embodiments are intended to be illustrative of two specific examples. In one embodiment, the central stem 112 of the probe 110 while each of the peripheral arms 114 remain rotatably fixed relative to the central stem 112, such that the peripheral arms 114 sweep out an area during rotation. By way of example and not limitation, in one embodiment, the probe 110 includes 6 peripheral arms each approximately 60° apart. In one embodiment, the probe 110 is rotated approximately 60° in one direction. In another embodiment, the probe 110 is rotated approximately 30° both clockwise and counterclockwise, such that a full 360° is scanned by the 6 peripheral arms. In one embodiment, the probe 110 includes 2 peripheral arms 114 positioned on opposite sides of the central stem 112. Positioning peripheral arms 114 on opposite sides assists in balancing the device and removing the effects of wobble on the scan results.

Figure 20:
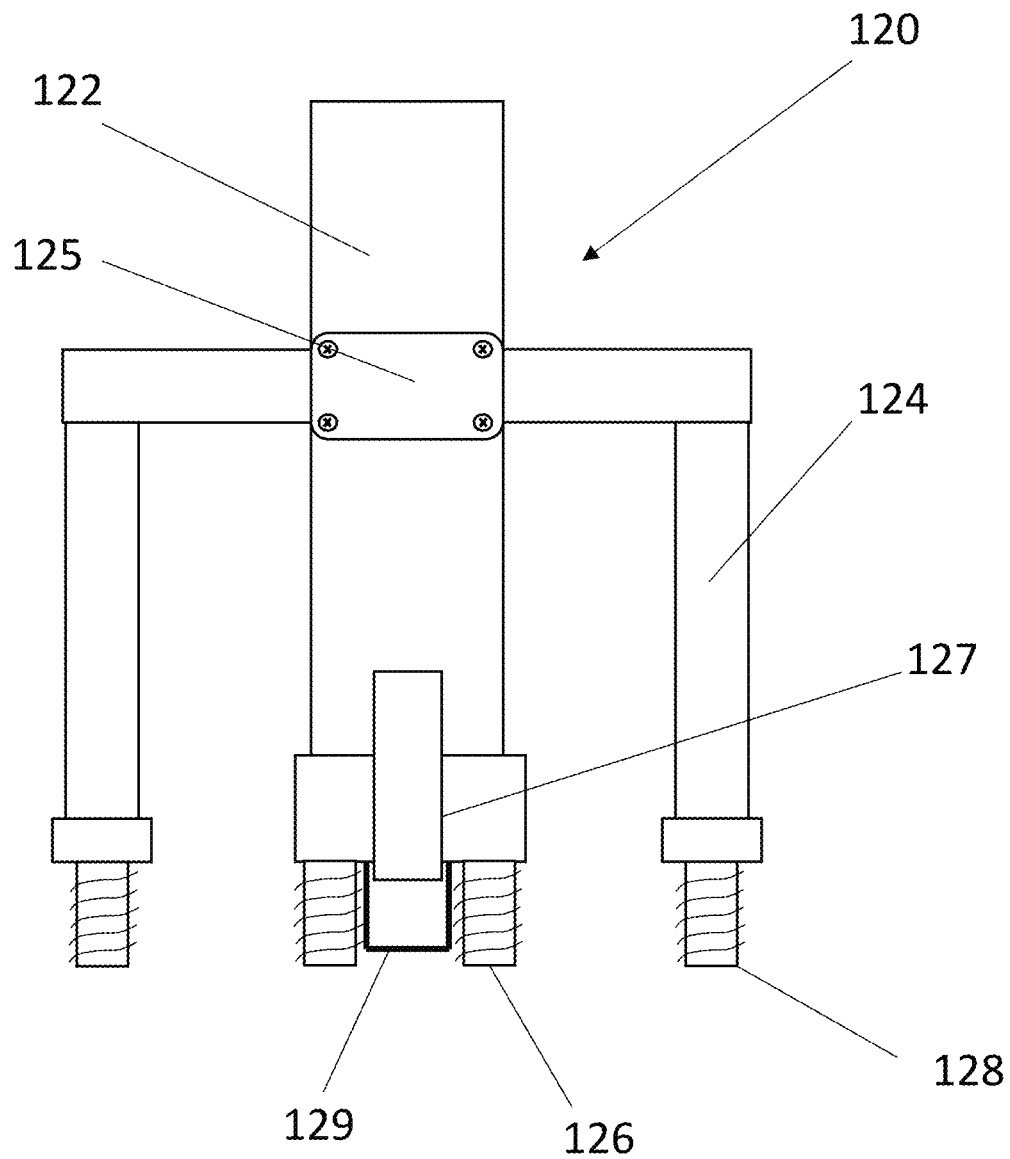
FIG. 20 illustrates a side view of a mixed eddy current-ultrasonic probe operable to physically rotate one or more transmitter or receiver coils around a central axis according to one embodiment of the present invention.

FIG. 20 illustrates a side view of a mixed eddy current-ultrasonic probe operable to physical rotate one or more transmitter or receiver coils around a central axis according to one embodiment of the present invention. In one embodiment, a probe 120 includes a central stem 122 including at least one ultrasonic transducer 127 extending through an opening in a bottom surface of the central stem 122. In one embodiment, the at least one ultrasonic transducer 127 is surrounded by a shielding layer 129 to prevent eddy currents from being induced in the at least one ultrasonic transducer 127. In one embodiment, the at least one ultrasonic transducer is surrounded by a plurality of eddy current transmitter and/or receiver coils 126. In one embodiment, one or more peripheral arms 124 extend substantially parallel to the central stem 122. In one embodiment, each of the one or more peripheral arms 124 are attached to a common area 125 of the central stem 122. In another embodiment, the one or more peripheral arms 124 are attached to different areas of the central stem 122. An end effector region of each of the one or more peripheral arms 124 includes at least one transmitter coil and/or at least one receiver coil 128.

Figure 21:
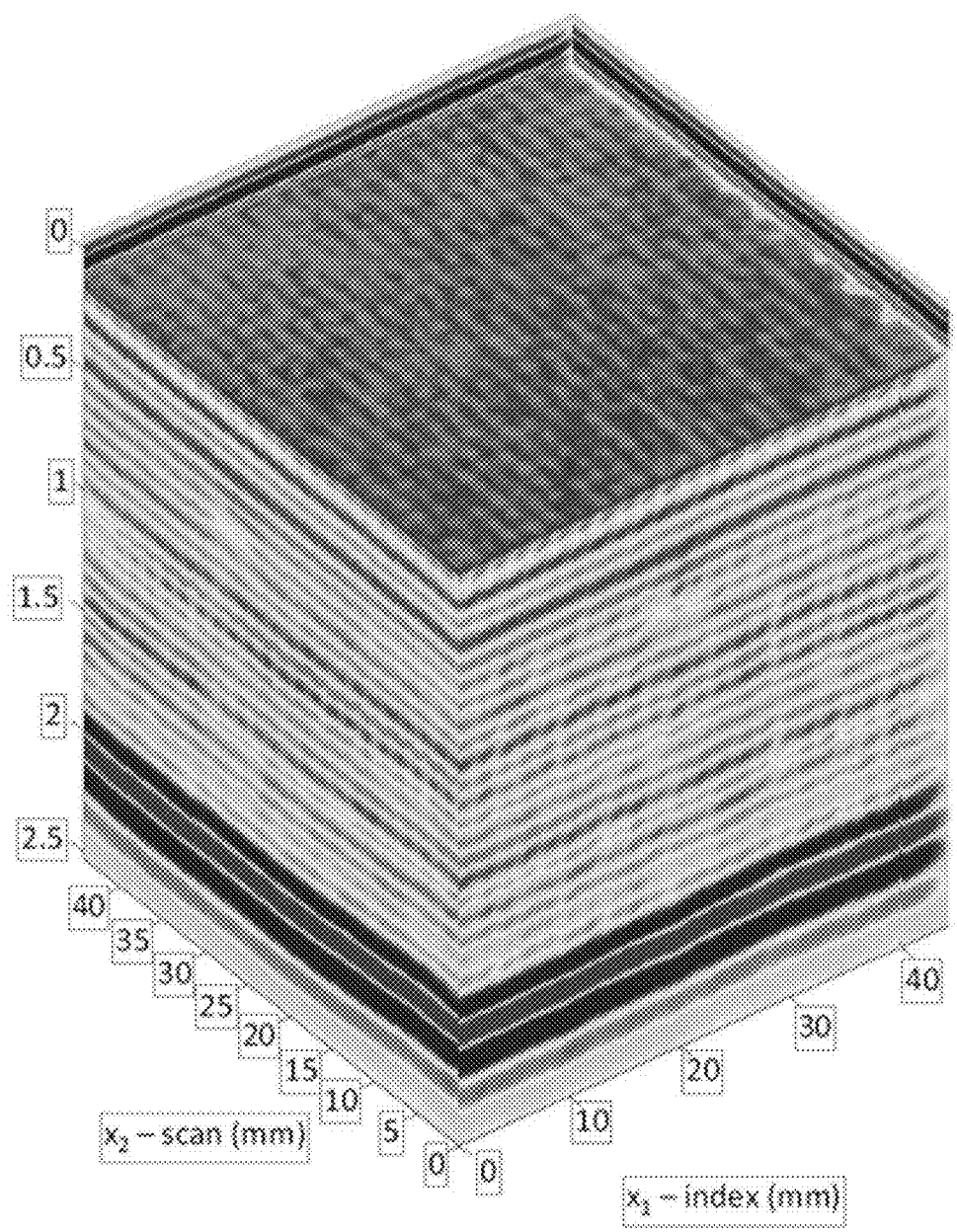
FIG. 21 is a three-dimensional scan image of a test object constructed from individual C-scan slices generated by both eddy current and ultrasonic scan data according to one embodiment of the present invention.

FIG. 21 is a three-dimensional scan image of a part constructed from individual C-scan slices generated by both eddy current and ultrasonic scan data according to one embodiment of the present invention. In one embodiment, a display connected to the at least one probe is operable to display a three-dimensional representation of a test object, wherein the three-dimensional representation is constructed from a plurality of C-scans produced by ultrasonic scan data and/or eddy current scan data. In one embodiment, the system is operable to receive an input selecting a depth to view within the material. The top C-scan image of the three-dimensional representation of the test object is displayed based on the selected depth. In this way, the representation is able to easily display a C-scan corresponding to any layer within the material such that the relative location of defects, inclusions, and/or irregularities, and/or the relative positioning of layers having different fiber orientations are easily visible with relation to the entire thickness of the part.

In another embodiment, the system is operable to generate a table view, wherein the table view includes a ply number (i.e., the layer number relative to a surface of the material), the angle of the directionality of the fibers within the ply relative to the baseline, whether the fibers within the ply are unidirectional or woven, and/or what type of signal data is used to determine the directionality of the fibers for that level (e.g., eddy current data, ultrasonic data, combined eddy current and ultrasonic data, etc.).

Figure 22:
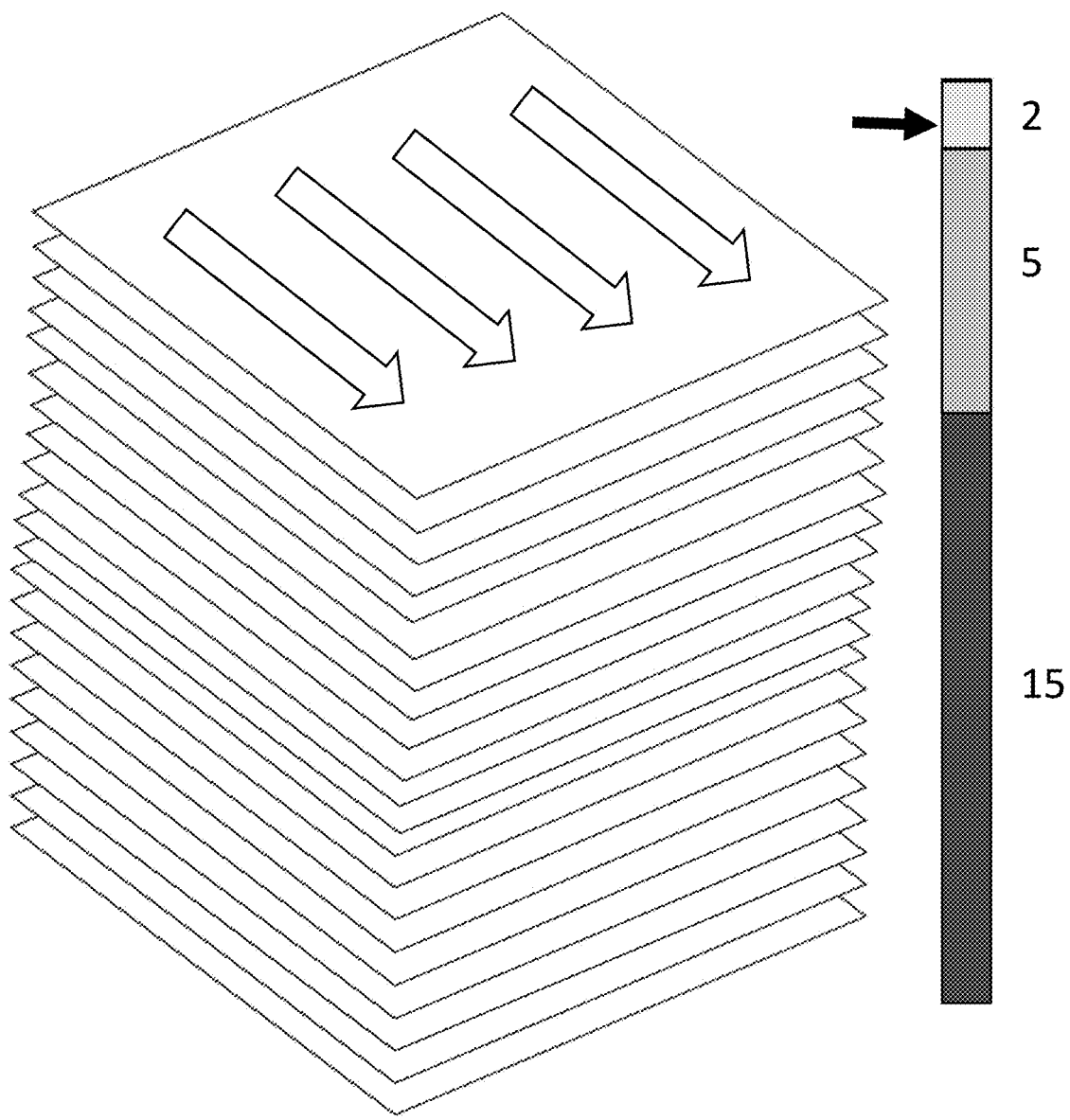
FIG. 22 is a three-dimensional image of a test object constructed from a plurality of slices demonstrating the directionality of fibers in a plurality of layers of the test object, generated based on both eddy current and ultrasonic scan data according to one embodiment of the present invention.

FIG. 22 is a three-dimensional image of a test object constructed from a plurality of slices demonstrating the directionality of fibers in a plurality of layers of the test object, generated based on both eddy current and ultrasonic scan data according to one embodiment of the present invention. In another embodiment, the system constructs a three-dimensional layered image wherein each layer of the image represents a layer of the test object, similar to the three-dimensional scan image shown in FIG. 21. However, in one embodiment, instead of showing C-scan images of the part, the system automatically generates a vector field for each layer based on eddy current scan data and ultrasonic scan data, wherein the vector field represents the fiber orientation in each layer. Similar to FIG. 21, in one embodiment, the system receives an input designating a layer of the test object to view and automatically peels back layers of the three-dimensional layered image until the selected layer is shown on top of the three-dimensional layered image. In one embodiment, the three-dimensional layered image includes a key showing what type of data was used to generate the vector field for each layer. By way of example and not limitation, in one embodiment, a color-coded bar is generated, wherein different colors of the color-coded bar symbolize different types of scan data and/or combinations of different types of scan data used to generate the vector field for each layer. In FIG. 22, yellow represents layers where the vector field is generated using only eddy current scan data, orange represents layers where the vector field is generated using both eddy current scan data and ultrasonic scan data, and red represents layers where the vector field is generated using only ultrasonic scan data. In one embodiment, the total number of layers corresponding to each type of scan data and/or each combination of different types of scan data used is displayed adjacent to the color-coded bar. In one embodiment, an arrow is generated pointing at the color-coded bar, wherein the arrow represents which layer of the layered image is currently being viewed. In another embodiment, the layer being viewed is colored in accordance with the key for the color-coded bar.

Figure 23A:
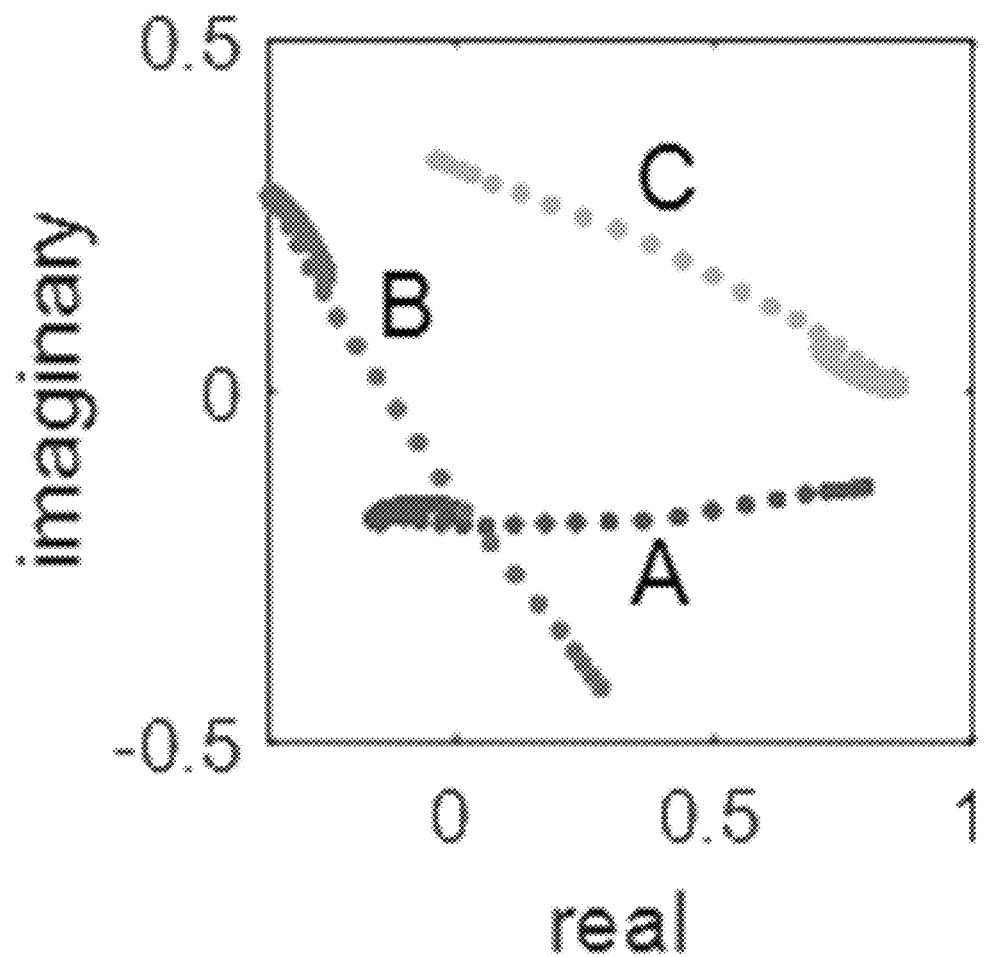
FIG. 23A is a cartesian coordinate plane plotting results from a single r-scan, with different specific channels or channel characteristics selected as representative of the single r-scan.
Figure 23B:
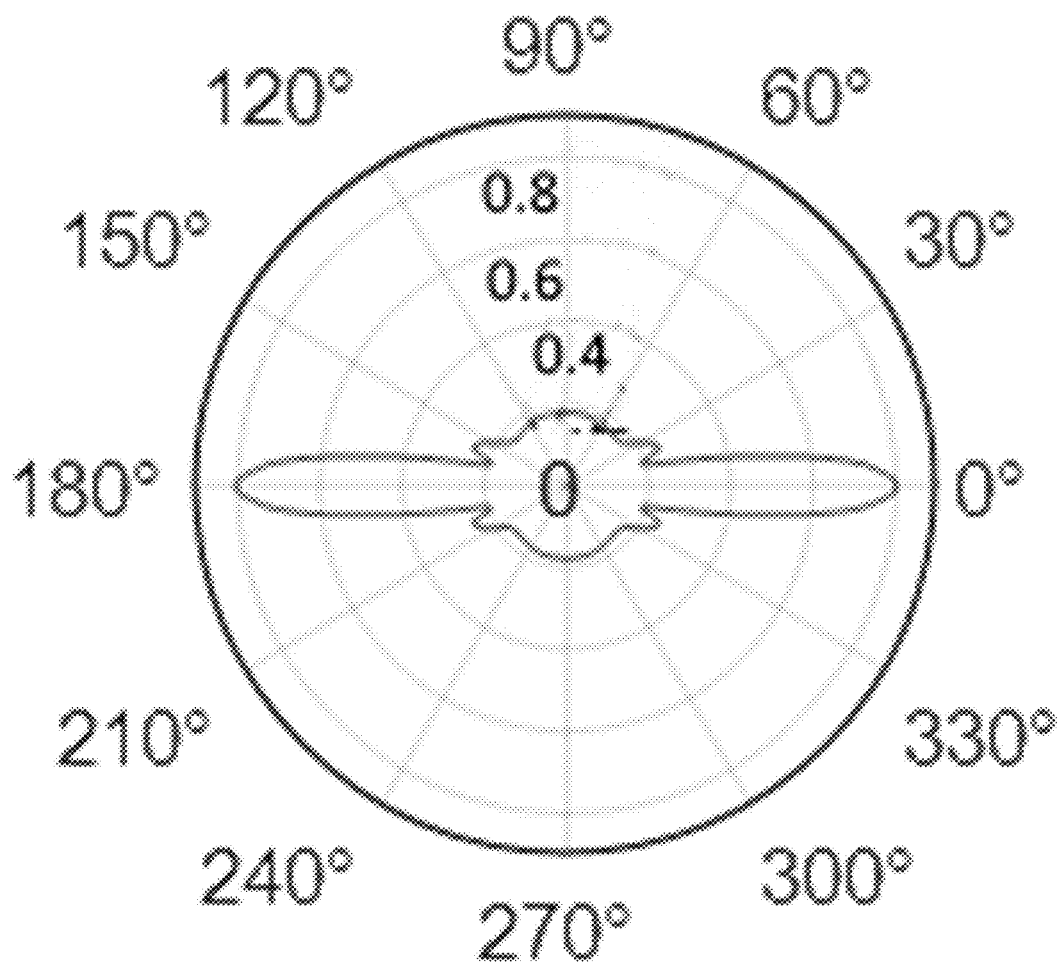
FIG. 23B is a phase-magnitude plane plot from a single r-scan, with a first specific channel or channel characteristic selected as representative of the single r-scan.
Figure 23C:
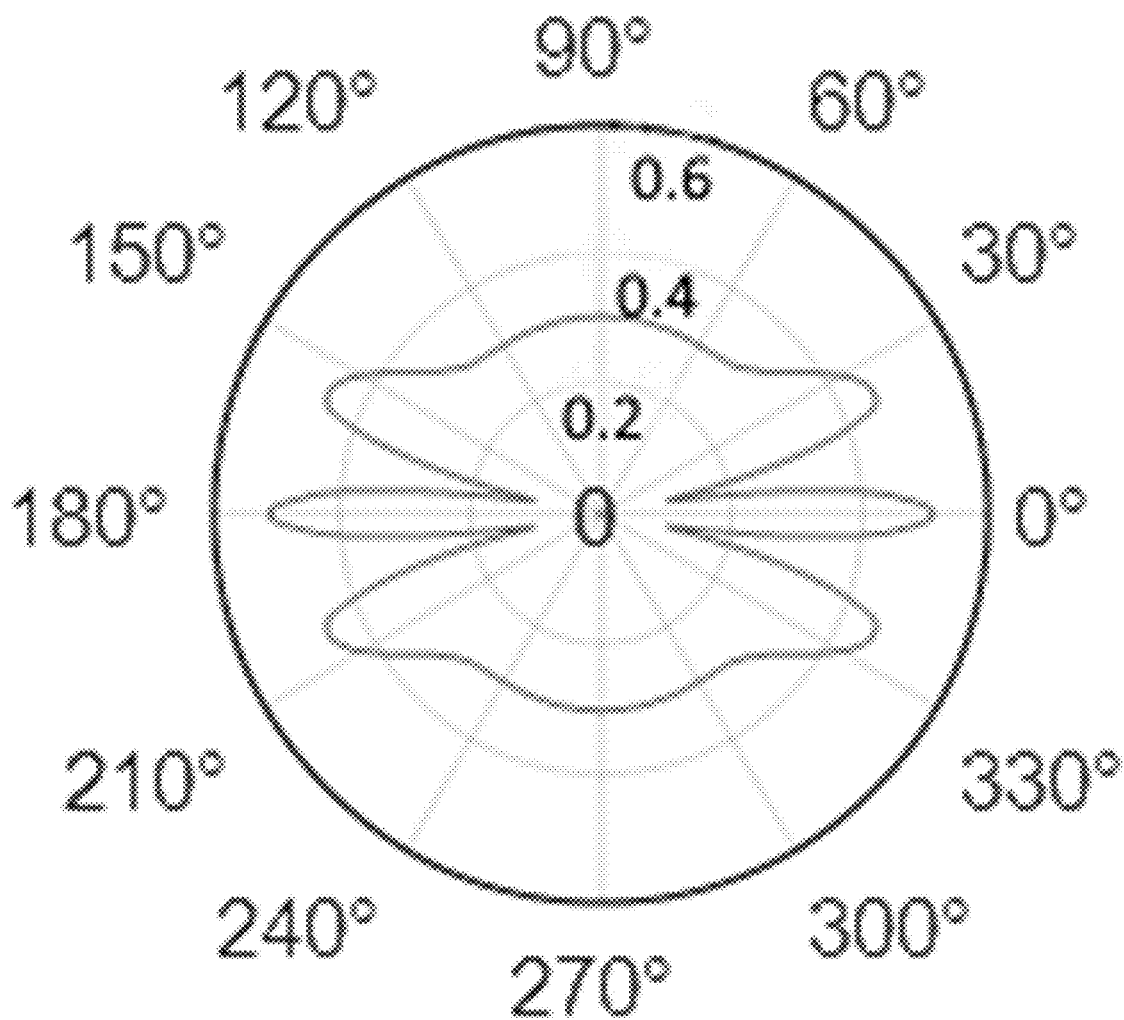
FIG. 23C is a phase-magnitude plot from the single r-scan of PRIOR ART FIG. 23B, with a second specific channel or channel characteristic selected as representative of the single r-scan.
Figure 23D:
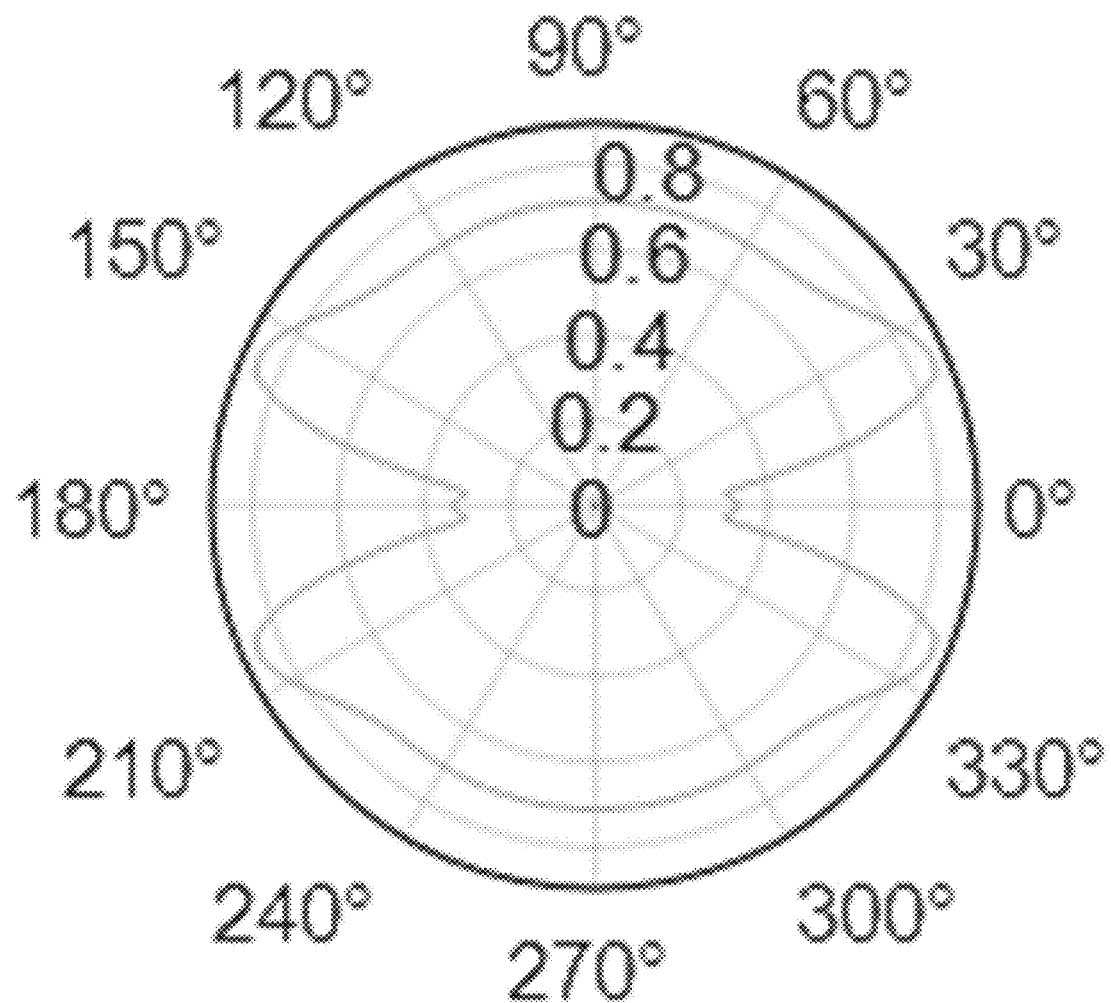
FIG. 23D is a phase-magnitude plot from the single r-scan of PRIOR ART FIG. 23B, with a third specific channel or channel characteristic selected as representative of the single r-scan.

In-phase/quadrature (I/Q) demodulation is an important part of eddy current signal processing for the present invention. While data is often presented as being received on a single channel, in practice, a demodulated signal always includes real and imaginary components, also termed the in-phase and quadrature components respectively. Commonly, in the prior art, only a single channel is selected as being most representative of the data and that channel is exclusively used for processing. However, this process loses information from the eddy current data and produces highly variable results based on small alignment changes between the probe and the test object, the type of probe used, the specific demodulation method used, or the frequency of the signal used. PRIOR ART FIG. 23A shows an instance of eddy current data where only a single channel is used to plot the signal on a complex plane, yielding much different results with the same r-scan when different channels or channel characteristics are isolated and used. Similarly, PRIOR ART FIGS. 23B-23D show the variance of such data in a rotational plot. The wide difference between the results from the same scans in these figures shows the challenges and limitations of prior art methods of signal processing.

In order to eliminate the inconsistency shown in FIGS. 23A-23D, the present system uses normalization methods to make r-scans from different test objects and different locations on a test object appear comparable. In one embodiment, the system utilizes eigenvector-based principal component analysis (PCA) in order to normalize the eddy current scans to determine ply orientation. Kalyanasundaram et al., in the paper "Eigenvalue-based Approach for Enhancement of Eddy Current Images of Shallow Defects" (2007) also used an eigenvalue approach to evaluate eddy current data (though note that Kalyanasundaram et al. is based on linear eddy current scans and is not used to determine ply orientation, as it works with carbon steel plates). Furthermore, the present system diverges from Kalyanasundaram et al. by utilizing scaling and basis decomposition.

Figure 24A:
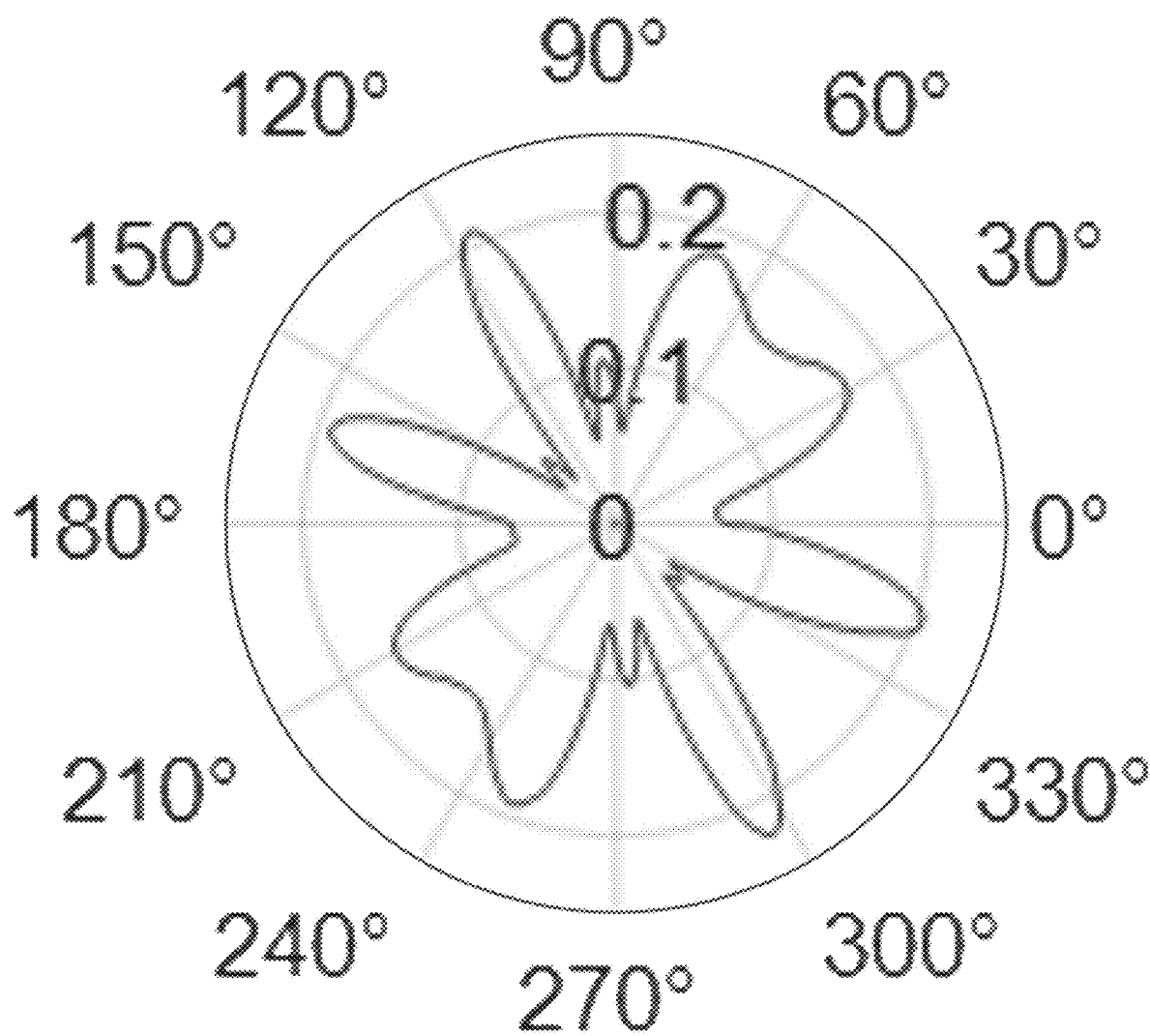
FIG. 24A is a phase-magnitude plot of r-scan results before normalization according to one embodiment of the present invention.
Figure 24B:
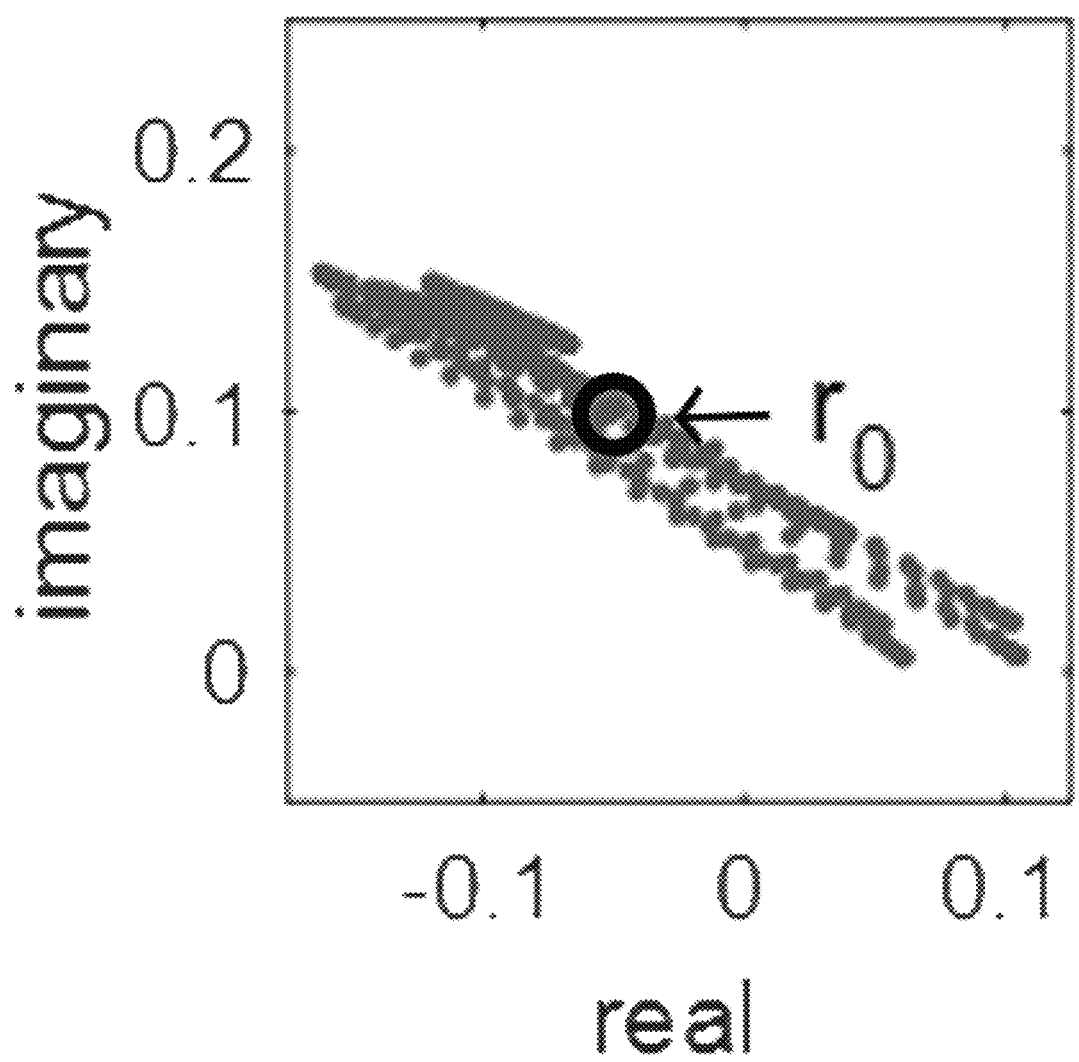
FIG. 24B is a Cartesian plot of the r-scan results of FIG. 24A.
Figure 24C:
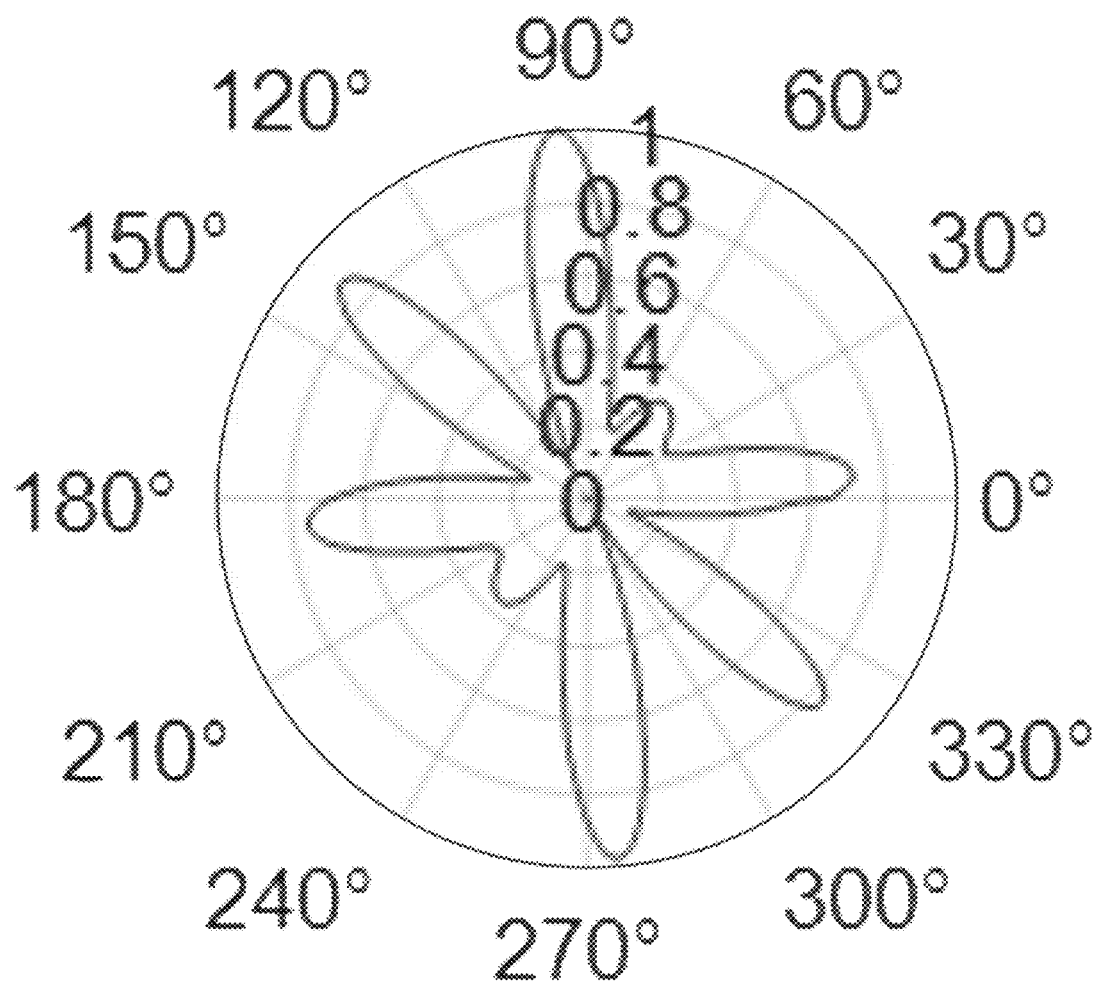
FIG. 24C is a phase-magnitude plot of the r-scan results of FIG. 24A after normalization according to one embodiment of the present invention.
Figure 24D:
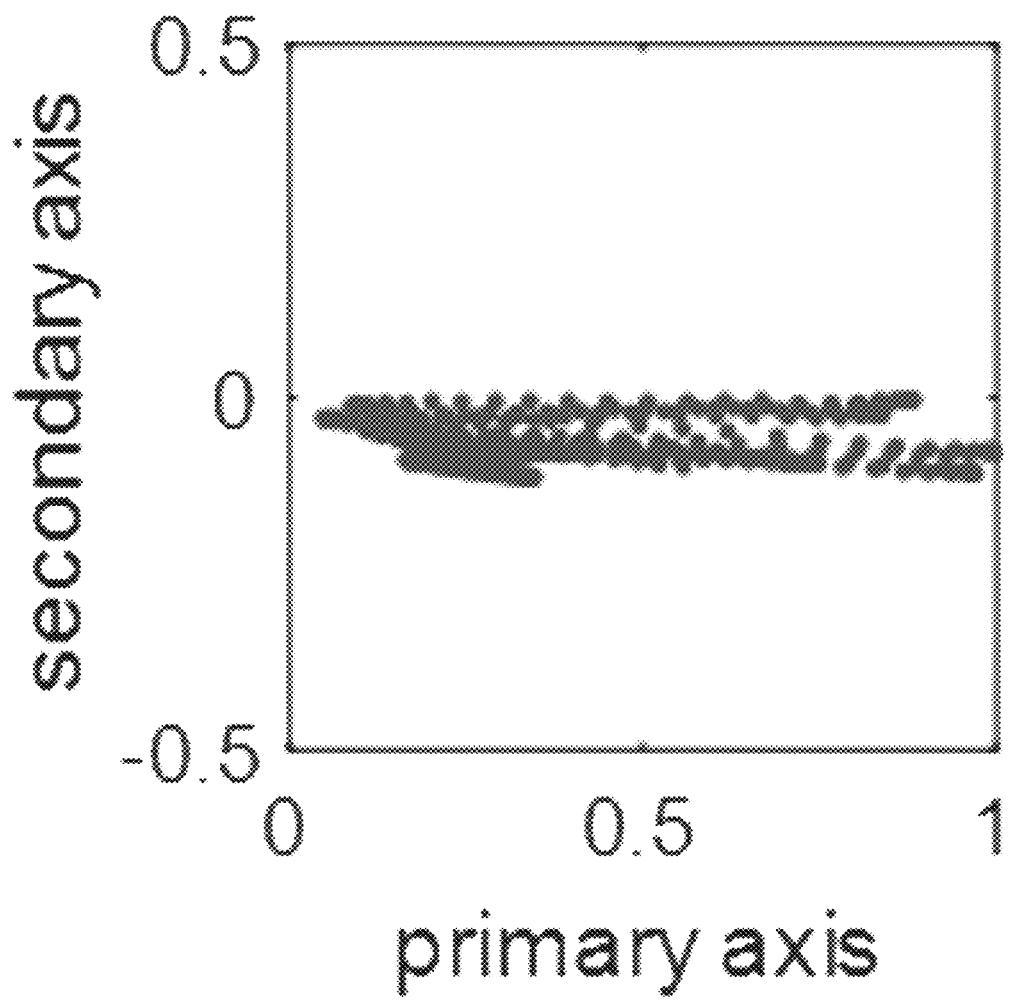
FIG. 24D is a Cartesian plot of the r-scan results of FIG. 24C.

According to the present invention, the demodulator signal $\vec{R}_n = \vec{R}(\theta_n)$ for n=1 ... N angular samples with a complex mean symbolized as $\vec{\mu}$. Phase-magnitude and Cartesian plotted versions of a signal $\vec{R}_n$ before normalization are shown in FIGS. 24A and 24B, respectively. Note that the arrow indicia indicates complex numbers. Real and imaginary parts of the zero mean complex signal are split into a two-column matrix X, where X=[Re{$\vec{R}_n - \mu$} Im{$\vec{R}_n - \mu$}]. A covariance matrix of these columns is calculated as $$C = \frac{X^T X}{N}$$

where N is the number of samples in the signal. If V is a 2×2 matrix of eigenvectors of the 2×2 covariance matrix C, sorted by prominence using weights of the eigenvalues $\vec{\lambda}$, then the original zero mean data is able to be projected onto the eigenvector matrix according to the magnitude of the eigenvalues to obtain a normalized real and imaginary signal in the columns of matrix T by the equation T=XV. Then, $\vec{R}'(\theta_n) = T_{\theta_{n,1}} + jT_{\theta_{n,2}}$ where $\vec{R}'(\theta_n)$ is a shift from the real minimum of $\vec{R}(\theta_n)$ such that $\vec{R}'(\theta_n)$ is completely positive and real. Phase-magnitude and Cartesian plotted versions of a signal $\vec{R}_n'$, corresponding to a processed version of the same signal shown in FIGS. 24A and 24B after normalization, are shown in FIGS. 24C and 24D, respectively.

Figure 25A:
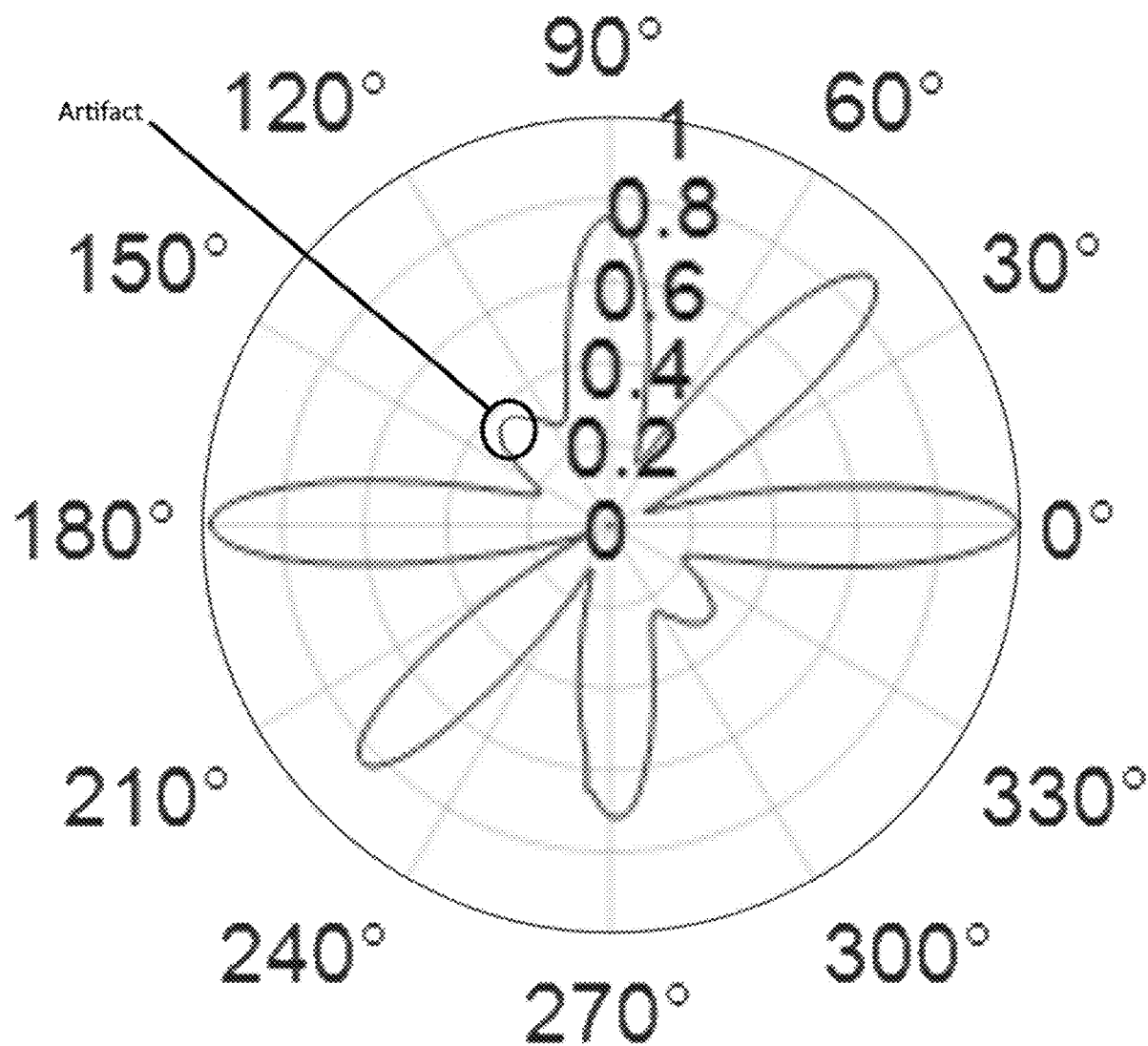
FIG. 25A is a phase-magnitude plot of a scan signal from a [0/45/90] degree layered composite material according to one embodiment of the present invention.
Figure 25B:
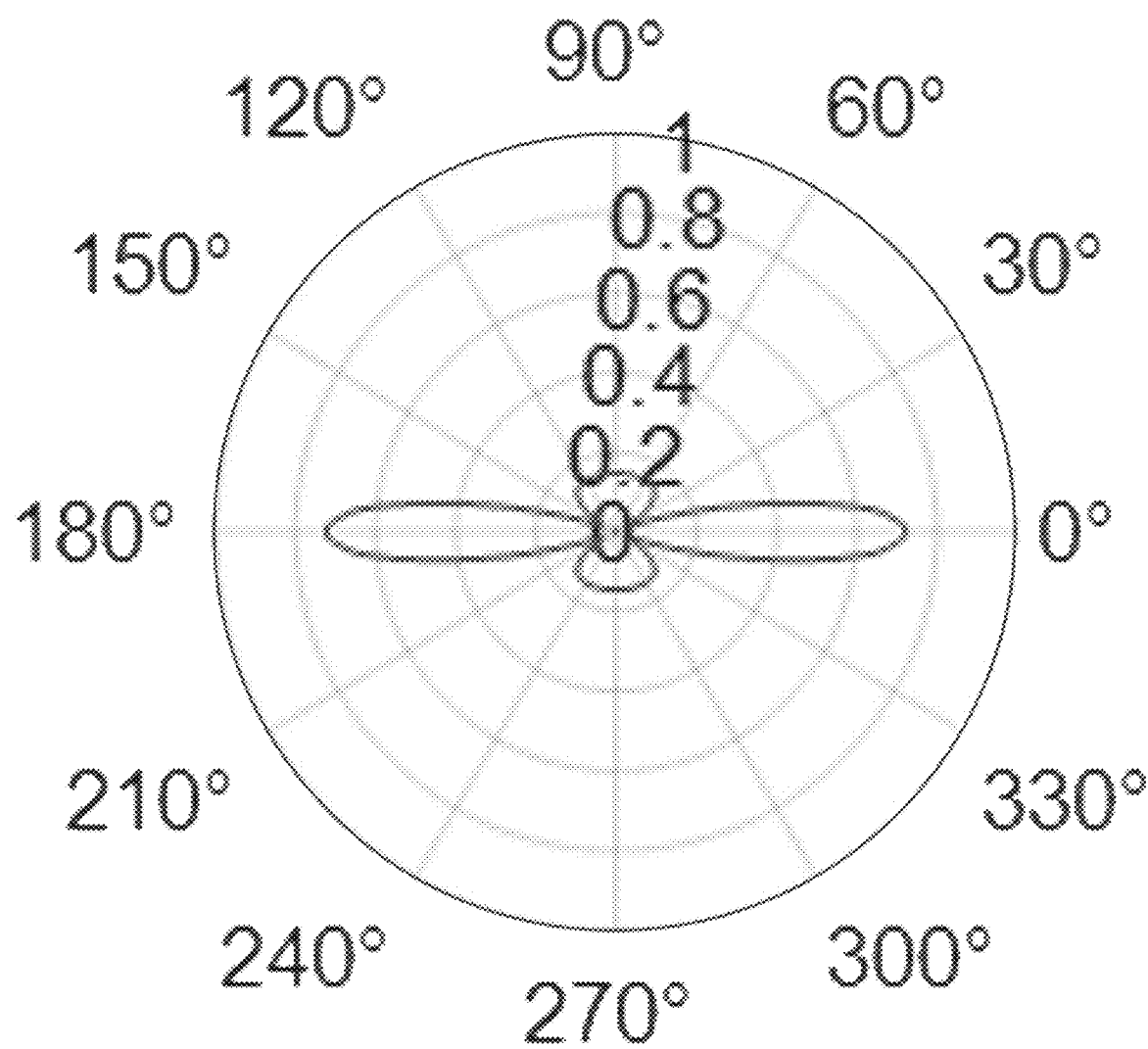
FIG. 25B is a phase-magnitude plot of a basis function for a 0-degree layer for the scan signal of FIG. 25A.
Figure 25C:
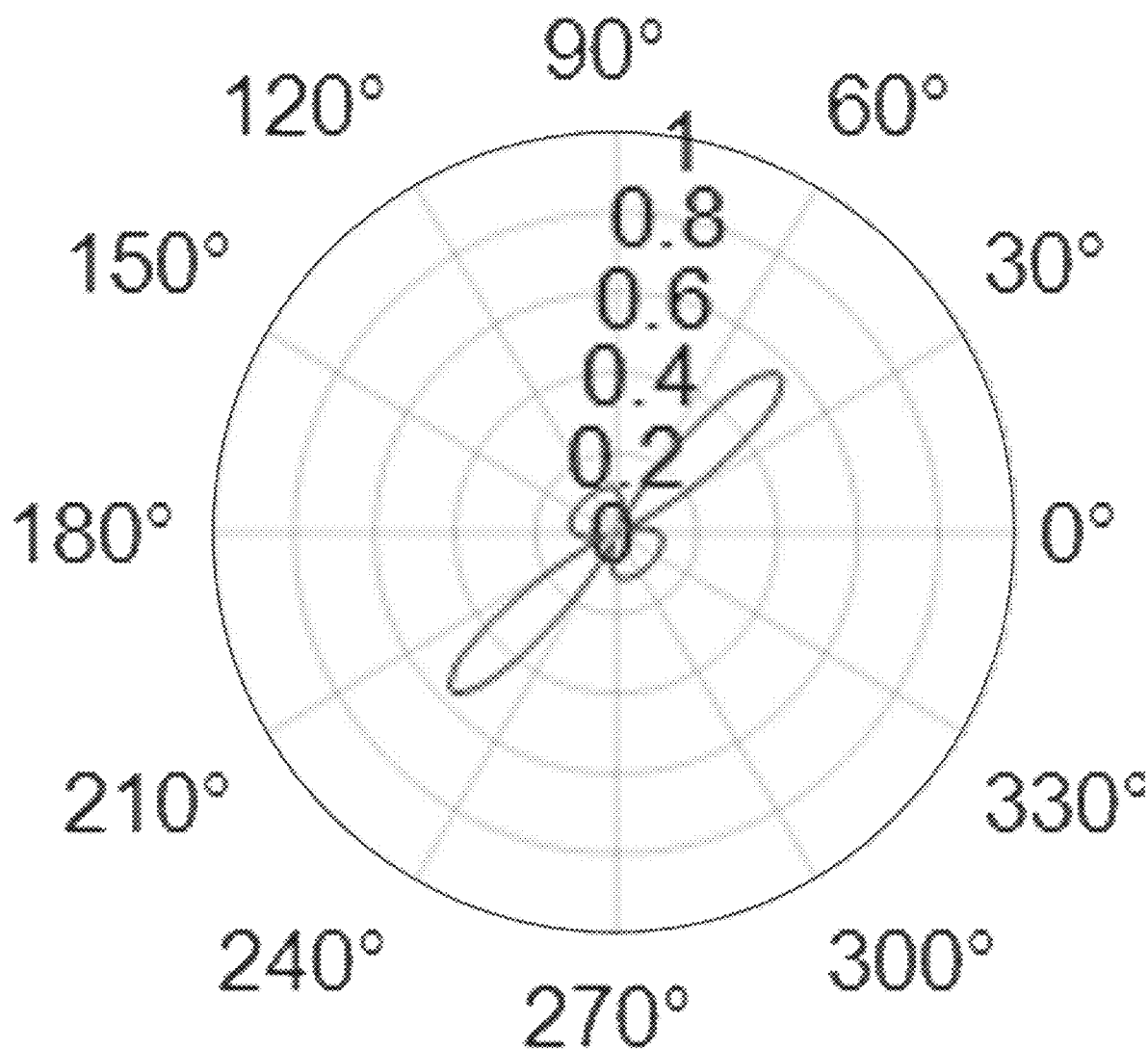
FIG. 25C is a phase-magnitude plot of a basis function for a 45-degree layer for the scan signal of FIG. 25A.
Figure 25D:
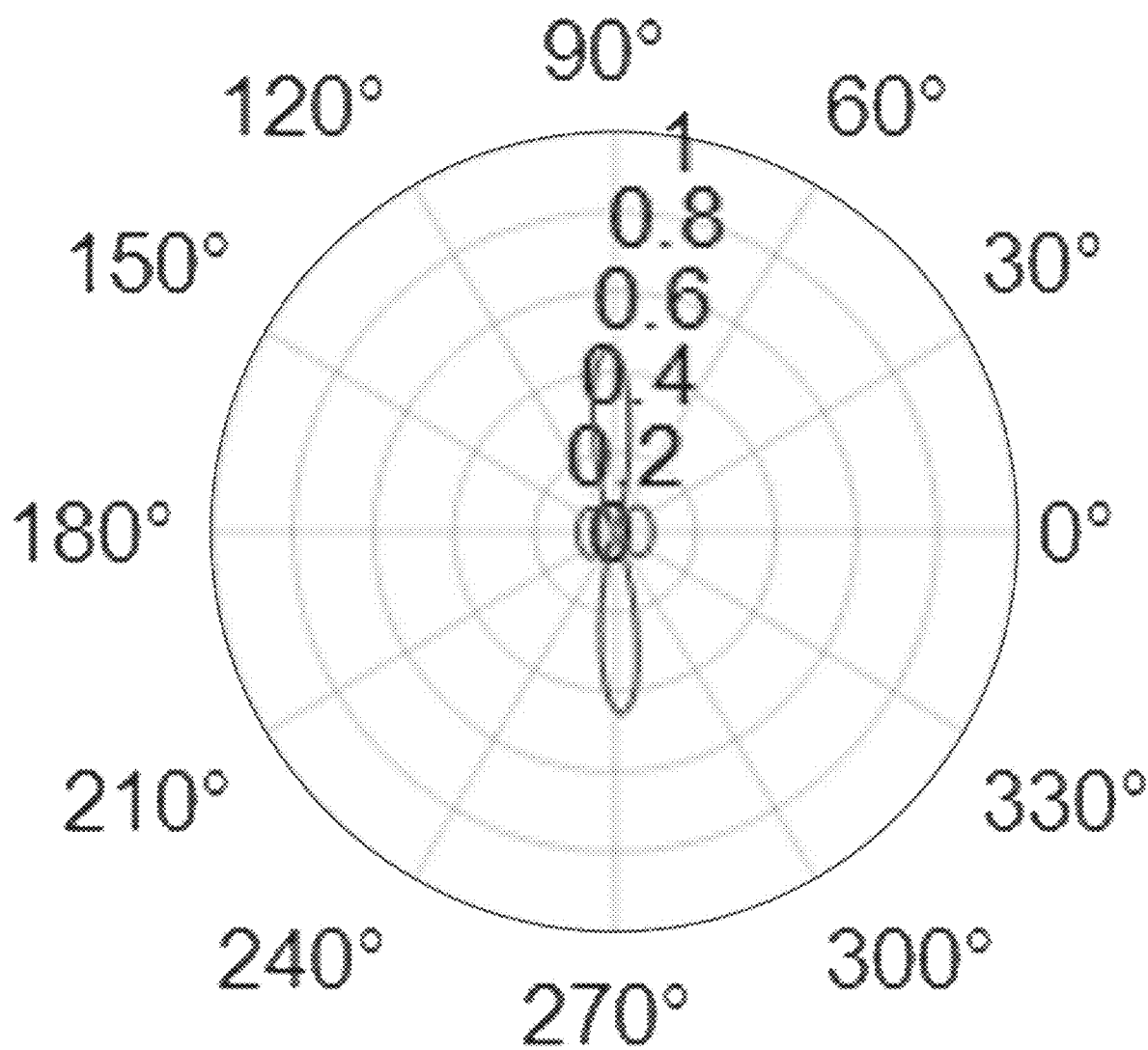
FIG. 25D is a phase-magnitude plot of a basis function for a 90-degree layer for the scan signal of FIG. 25A.

The present system is also able to determine the orientations of each specific layer of a layered composite test object through decomposition. FIG. 25A provides an example of a scan of a test object having three layers with known orientations of [0/45/90] degrees. Despite these known orientations, the plot in FIG. 25A shows peaks at four, not three, angles. This fourth peak is an artifact attributable to side lobes from data received from other layers, in this case largely the layer angled at 45 degrees. In order to verify the lay-up of the part, the scan data is able to be decomposed into individual basis functions scaled according to depth and then recombined as a superposition of those basis functions. The basis functions used as theoretical scans of a unidirectionally oriented layer of the same material type (e.g., carbon fiber reinforced plastic) angled along a predicted, or known, orientation of each respective layer. Therefore, the combined signal shown in FIG. 25A is able to be decomposed into three basis functions angled at 0 degrees, 45 degrees, and 90 degrees, as shown in FIG. 25B, FIG. 25C, and FIG. 25D, respectively.

In one embodiment, if the angle or order (i.e., depth from the testing surface) of the orientations is unknown, the system is able to shift the magnitude and/or angle of the basis functions in order to determine the likely result. In one embodiment, a search algorithm is used to find the shifted basis function weights that minimize the $L_2$ norm defined according to Equations 1 and 2 below:

$$\tilde{x} = \arg\min_{A,B,\alpha_k,\beta_k,\phi_k} \|\tilde{f} - f\| \qquad \text{Equation 1}$$

$$\tilde{f} = A + jB + \sum_{k=1}^{K}(\alpha_k + j\beta_k)f_{basis}(\theta - \phi_k) \qquad \text{Equation 2}$$

In Equations 1 and 2, f designates the raw complex signal generated by scanning a test object. $\tilde{f}$ is an approximate reconstructed complex signal consisting of a linear combination of shifted and scaled complex basis signals. $\tilde{x}$ is a vector quantity containing all variables involved in the arg min search. K is a number of linear basis combinations in the equation. In one embodiment, K is set equal to the number of laminae of the object being inspected. A represents a real DC offset of $\tilde{f}$, while B is the imaginary component of the DC offset of $\tilde{f}$, such that A+jB represents the complex-valued DC offset. $\alpha_k$ represents the real linear scaling of the complex basis function of the kth laminae, while $\beta_k$ represents the imaginary linear scaling for the complex basis function for the kth laminae. $\phi_k$ represents the angular shift of the complex basis function for the kth laminae, which is equal to the fiber direction.

In this way, based on the amplitude and angle of the basis functions that minimize the $L_2$ norm, the system is able to automatically determine the specific angles of each layer and/or the relative depth of each layer.

The normalization used by the present system is able to determining the ply orientation while factoring out complex offset and orientation artifacts in how the testing is conducted. However, in one embodiment, the system is also able to determine the complex offset and/or orientation for each scan. By way of example and not limitation, in one embodiment, the complex shift is calculated as $$r_0 = \sum_{n=1}^{N} \frac{\tilde{R}_n}{N},$$

while the orientation is able to be determined from the eigenvectors as $$\alpha_0 = \tan^{-1}\frac{V_{p,y}}{V_{p,x}}$$

where $\vec{V_p}$ is the primary eigenvector from the matrix of eigenvectors V. The primary eigenvector is herein defined as the eigenvector corresponding to the greatest eigenvalue of the covariance matrix.

Figure 26:
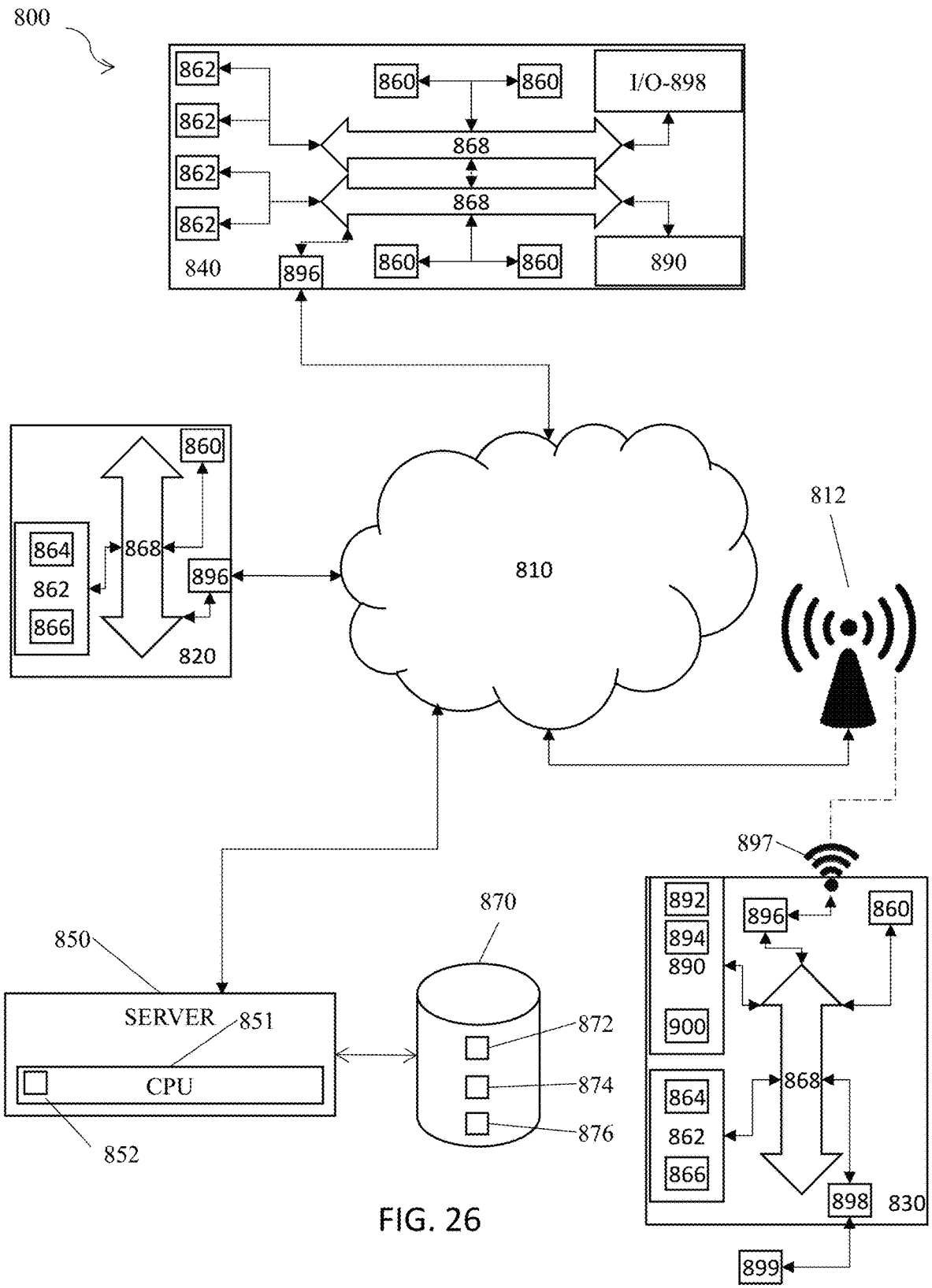
FIG. 26 is a schematic diagram of a system of the present invention.

FIG. 26 is a schematic diagram of an embodiment of the invention illustrating a computer system, generally described as 800, having a network 810, a plurality of computing devices 820, 830, 840, a server 850, and a database 870.

The server 850 is constructed, configured, and coupled to enable communication over a network 810 with a plurality of computing devices 820, 830, 840. The server 850 includes a processing unit 851 with an operating system 852. The operating system 852 enables the server 850 to communicate through network 810 with the remote, distributed user devices. Database 870 is operable to house an operating system 872, memory 874, and programs 876.

In one embodiment of the invention, the system 800 includes a network 810 for distributed communication via a wireless communication antenna 812 and processing by at least one mobile communication computing device 830. Alternatively, wireless and wired communication and connectivity between devices and components described herein include wireless network communication such as WI-FI, WORLDWIDE INTEROPERABILITY FOR MICROWAVE ACCESS (WIMAX), Radio Frequency (RF) communication including RF identification (RFID), NEAR FIELD COMMUNICATION (NFC), BLUETOOTH including BLUETOOTH LOW ENERGY (BLE), ZIGBEE, Infrared (IR) communication, cellular communication, satellite communication, Universal Serial Bus (USB), Ethernet communications, communication via fiber-optic cables, coaxial cables, twisted pair cables, and/or any other type of wireless or wired communication. In another embodiment of the invention, the system 800 is a virtualized computing system capable of executing any or all aspects of software and/or application components presented herein on the computing devices 820, 830, 840. In certain aspects, the computer system 800 is operable to be implemented using hardware or a combination of software and hardware, either in a dedicated computing device, or integrated into another entity, or distributed across multiple entities or computing devices.

By way of example, and not limitation, the computing devices 820, 830, 840 are intended to represent various forms of electronic devices including at least a processor and a memory, such as a server, blade server, mainframe, mobile phone, personal digital assistant (PDA), smartphone, desktop computer, netbook computer, tablet computer, workstation, laptop, and other similar computing devices. The components shown here, their connections and relationships, and their functions, are meant to be exemplary only, and are not meant to limit implementations of the invention described and/or claimed in the present application.

In one embodiment, the computing device 820 includes components such as a processor 860, a system memory 862 having a random access memory (RAM) 864 and a read-only memory (ROM) 866, and a system bus 868 that couples the memory 862 to the processor 860. In another embodiment, the computing device 830 is operable to additionally include components such as a storage device 890 for storing the operating system 892 and one or more application programs 894, a network interface unit 896, and/or an input/output controller 898. Each of the components is operable to be coupled to each other through at least one bus 868. The input/output controller 898 is operable to receive and process input from, or provide output to, a number of other devices 899, including, but not limited to, alphanumeric input devices, mice, electronic styluses, display units, touch screens, signal generation devices (e.g., speakers), or printers.

By way of example, and not limitation, the processor 860 is operable to be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that can perform calculations, process instructions for execution, and/or other manipulations of information.

In another implementation, shown as 840 in FIG. 26, multiple processors 860 and/or multiple buses 868 are operable to be used, as appropriate, along with multiple memories 862 of multiple types (e.g., a combination of a DSP and a microprocessor, a plurality of microprocessors, one or more microprocessors in conjunction with a DSP core).

Also, multiple computing devices are operable to be connected, with each device providing portions of the necessary operations (e.g., a server bank, a group of blade servers, or a multi-processor system). Alternatively, some steps or methods are operable to be performed by circuitry that is specific to a given function.

According to various embodiments, the computer system 800 is operable to operate in a networked environment using logical connections to local and/or remote computing devices 820, 830, 840 through a network 810. A computing device 830 is operable to connect to a network 810 through a network interface unit 896 connected to a bus 868. Computing devices are operable to communicate communication media through wired networks, direct-wired connections or wirelessly, such as acoustic, RF, or infrared, through an antenna 897 in communication with the network antenna 812 and the network interface unit 896, which are operable to include digital signal processing circuitry when necessary. The network interface unit 896 is operable to provide for communications under various modes or protocols.

In one or more exemplary aspects, the instructions are operable to be implemented in hardware, software, firmware, or any combinations thereof. A computer readable medium is operable to provide volatile or non-volatile storage for one or more sets of instructions, such as operating systems, data structures, program modules, applications, or other data embodying any one or more of the methodologies or functions described herein. The computer readable medium is operable to include the memory 862, the processor 860, and/or the storage media 890 and is operable be a single medium or multiple media (e.g., a centralized or distributed computer system) that store the one or more sets of instructions 900. Non-transitory computer readable media includes all computer readable media, with the sole exception being a transitory, propagating signal per se. The instructions 900 are further operable to be transmitted or received over the network 810 via the network interface unit 896 as communication media, which is operable to include a modulated data signal such as a carrier wave or other transport mechanism and includes any delivery media. The term "modulated data signal" means a signal that has one or more of its characteristics changed or set in a manner as to encode information in the signal.

Storage devices 890 and memory 862 include, but are not limited to, volatile and non-volatile media such as cache, RAM, ROM, EPROM, EEPROM, FLASH memory, or other solid state memory technology; discs (e.g., digital versatile discs (DVD), HD-DVD, BLU-RAY, compact disc (CD), or CD-ROM) or other optical storage; magnetic cassettes, magnetic tape, magnetic disk storage, floppy disks, or other magnetic storage devices; or any other medium that can be used to store the computer readable instructions and which can be accessed by the computer system 800.

In one embodiment, the computer system 800 is within a cloud-based network. In one embodiment, the server 850 is a designated physical server for distributed computing devices 820, 830, and 840. In one embodiment, the server 850 is a cloud-based server platform. In one embodiment, the cloud-based server platform hosts serverless functions for distributed computing devices 820, 830, and 840.

In another embodiment, the computer system 800 is within an edge computing network. The server 850 is an edge server, and the database 870 is an edge database. The edge server 850 and the edge database 870 are part of an edge computing platform. In one embodiment, the edge server 850 and the edge database 870 are designated to distributed computing devices 820, 830, and 840. In one embodiment, the edge server 850 and the edge database 870 are not designated for distributed computing devices 820, 830, and 840. The distributed computing devices 820, 830, and 840 connect to an edge server in the edge computing network based on proximity, availability, latency, bandwidth, and/or other factors.

It is also contemplated that the computer system 800 is operable to not include all of the components shown in FIG. 26, is operable to include other components that are not explicitly shown in FIG. 26, or is operable to utilize an architecture completely different than that shown in FIG. 26. The various illustrative logical blocks, modules, elements, circuits, and algorithms described in connection with the embodiments disclosed herein are operable to be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application (e.g., arranged in a different order or partitioned in a different way), but such implementation decisions should not be interpreted as causing a departure from the scope of the present invention.

Certain modifications and improvements will occur to those skilled in the art upon a reading of the foregoing description. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

The invention claimed is:

1. A system for determining ply orientation of a composite material, comprising:
an eddy current probe including a two-dimensional matrix of induction coils in communication with at least one signal generator and a processor;
an ultrasonic transducer positioned in a center of the two-dimensional matrix of induction coils;
at least one actuator configured to move the eddy current probe along a plane substantially coplanar to a surface of the composite material;
wherein the eddy current probe is positioned proximate to, but not in contact with, the surface of the composite material;
wherein the at least one signal generator is operable to activate a linear set of induction coils within the two-dimensional matrix of induction coils aligned along a first axis;
wherein the at least one signal generator is operable to vary which of the two-dimensional matrix of induction coils are activated such that the first axis rotates while the at least one signal generator remains substantially stationary over a section of the composite material; and
wherein the at least one actuator is configured to translate the eddy current probe to a new location after the first axis of the activated linear set of induction coils has rotated at least 360°.

2. The system of claim 1, wherein at each section of the composite material, the first axis rotates through a plurality of complete rotations, and wherein the processor averages scan data generated from each of the plurality of complete rotations.

3. The system of claim 1, wherein the system includes at least one encoder in communication with the processor, and wherein the at least one encoder is operable to generate location data for the eddy current probe.

4. The system of claim 1, wherein the ultrasonic transducer is configured to generate ultrasonic scan data of the composite material, and wherein the ultrasonic scan data includes one or more C-scans of the composite material at different depths and/or different locations on the composite material.

5. The system of claim 1, wherein a demodulator receives signal data from the eddy current probe after each scan and demodulates the signal data into in-phase and quadrature components.

6. The system of claim 5, wherein a low-pass filter filters frequencies greater than a predetermined threshold for the in-phase and quadrature components.

7. The system of claim 1, wherein the two-dimensional matrix of induction coils is driven by alternating current having a frequency greater than 10 MHz.

8. The system of claim 1, wherein the at least one signal generator varying which of the two dimensional matrix of induction coils are activated does not involve physical movement or translation of any induction coil relative to the eddy current probe.

9. A method for determining ply orientation of a composite material, comprising:
providing an eddy current probe including a two-dimensional matrix of induction coils in communication with at least one signal generator and a processor;
providing an ultrasonic transducer positioned in a center of the two-dimensional matrix of induction coils;
the eddy current probe being positioned proximate to, but not in contact with, the surface of the composite material;
the at least one signal generator activating a linear set of induction coils within the two-dimensional matrix of induction coils aligned along a first axis;
the at least one signal generator varying which of the two-dimensional matrix of induction coils are activated such that the first axis rotates while the at least one signal generator remains substantially stationary over a section of the composite material; and
at least one actuator translating the eddy current probe to a new location after the first axis of the activated linear set of induction coils has rotated at least 360°.

10. The method of claim 9, comprising, at each section of the composite material, the first axis rotating through a plurality of complete rotations, and the processor averaging scan data generated from each of the plurality of complete rotations.

11. The method of claim 9, further including at least one encoder in communication with the processor, the at least one encoder generating location data for the eddy current probe.

12. The method of claim 9, further including the ultrasonic transducer generating ultrasonic scan data of the composite material, wherein the ultrasonic scan data includes one or more C-scans of the composite material at different depths and/or different locations on the composite material.

13. The method of claim 9, further comprising a demodulator receiving signal data from the eddy current probe after each scan and demodulating the signal data into in-phase and quadrature components.

14. The method of claim 13, further comprising a low-pass filter filtering frequencies greater than a predetermined threshold for the in-phase and quadrature components.

15. The method of claim 9, further comprising the two-dimensional matrix of induction coils being driven by alternating current having a frequency greater than 10 MHz.

16. The method of claim 9, wherein the at least one signal generator varying which of the two dimensional matrix of induction coils are activated does not involve physical movement or translation of any induction coil relative to the eddy current probe.

17. A system for determining ply orientation of a composite material, comprising:
an eddy current probe including a two-dimensional matrix of induction coils in communication with at least one signal generator and a processor;
an ultrasonic transducer configured to generate ultrasonic scan data of the composite material, wherein the ultrasonic transducer is positioned in a center of the two-dimensional matrix of induction coils;
wherein the eddy current probe is positioned proximate to, but not in contact with, the surface of the composite material;
wherein the ultrasonic scan data includes one or more C-scans of the composite material at different depths and/or different locations on the composite material;
wherein the at least one signal generator is operable to activate a linear set of induction coils within the two-dimensional matrix of induction coils aligned along a first axis; and
wherein the at least one signal generator is operable to vary which of the two-dimensional matrix of induction coils are activated such that the first axis rotates while the at least one signal generator remains substantially stationary over a section of the composite material.

18. The system of claim 17, wherein the processor generates a three-dimensional model of the composite material based on scan data generated by the eddy current probe and the ultrasonic scan data, wherein the three-dimensional model is comprised of a multiplicity of scan slices, wherein a first subset of the multiplicity of scan slices is generated based on the ultrasonic scan data and a second subset of the multiplicity of scan slices is generated based on scan data generated by the eddy current probe.

19. The system of claim 17, wherein the two-dimensional matrix of induction coils is driven by alternating current having a frequency greater than 10 MHz.

20. The system of claim 17, wherein the at least one signal generator varying which of the two-dimensional matrix of induction coils are activated does not involve physical movement or translation of any induction coil relative to the eddy current probe.

* * * * *